United States Patent
Cao et al.

(10) Patent No.: US 12,488,846 B2
(45) Date of Patent: Dec. 2, 2025

(54) NEGATIVE WORD LINE ENABLED PRE-BOOSTING STRATEGY TO IMPROVE NAND PROGRAM PERFORMANCE

(71) Applicant: Sandisk Technologies, Inc., Milpitas, CA (US)

(72) Inventors: Wei Cao, Fremont, CA (US); Xiang Yang, Santa Clara, CA (US); Peng Zhang, San Jose, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 220 days.

(21) Appl. No.: 18/346,352

(22) Filed: Jul. 3, 2023

(65) Prior Publication Data
US 2024/0355401 A1 Oct. 24, 2024

Related U.S. Application Data

(60) Provisional application No. 63/497,954, filed on Apr. 24, 2023.

(51) Int. Cl.
*G11C 16/34* (2006.01)
*G11C 11/56* (2006.01)
(Continued)

(52) U.S. Cl.
CPC ...... *G11C 16/3459* (2013.01); *G11C 11/5628* (2013.01); *G11C 11/5642* (2013.01);
(Continued)

(58) Field of Classification Search
CPC . G11C 16/3459; G11C 16/0433; G11C 16/08; G11C 16/102; G11C 11/5628;
(Continued)

(56) References Cited

U.S. PATENT DOCUMENTS 6,859,397 B2 * 2/2005 Lutze ................ G11C 16/3418
365/185.28
7,672,169 B2 3/2010 Ueno
(Continued)

OTHER PUBLICATIONS

U.S. Appl. No. 16/200,007, filed Nov. 26, 2018.
U.S. Appl. No. 16/418,642, filed May 21, 2019.
U.S. Appl. No. 16/528,349, filed Jul. 31, 2019.

*Primary Examiner* — Amir Zarabian
*Assistant Examiner* — Justin Bryce Heisterkamp
(74) *Attorney, Agent, or Firm* — Pearl Cohen Zedek Latzer Baratz LLP

(57) ABSTRACT

To improve programming performance in NAND memory, while maintaining programming accuracy and reducing program disturb, the channel pre-charge phase before a programming pulse can be eliminated. Instead, a read recovery phase after the program verify directly discharges a selected word line from the verify voltage to a negative word line voltage, with non-selected word lines being directly discharged from the read bypass voltage to the negative word line voltage. From the negative word line voltage, the word lines are then ramped up to ground and then on the bias levels of the following programming pulse. These conditions can drive electrons from the charge storage region of the selected memory cell, resulting in a high degree of channel boosting and much less program disturb. Variations of the technique can be applied to NAND memory operable in a sub-block mode where it can be difficult to use the typical channel pre-charge.

18 Claims, 28 Drawing Sheets

(51) Int. Cl.
    *G11C 16/04*       (2006.01)
    *G11C 16/08*       (2006.01)
    *G11C 16/10*       (2006.01)
    *G11C 16/24*       (2006.01)
    *G11C 16/26*       (2006.01)
    *G11C 16/32*       (2006.01)

(52) U.S. Cl.
    CPC ...... *G11C 16/0433* (2013.01); *G11C 16/0483* (2013.01); *G11C 16/08* (2013.01); *G11C 16/10* (2013.01); *G11C 16/102* (2013.01); *G11C 16/24* (2013.01); *G11C 16/26* (2013.01); *G11C 16/32* (2013.01)

(58) Field of Classification Search
    CPC . G11C 11/5642; G11C 16/0483; G11C 16/10; G11C 16/24; G11C 16/26; G11C 16/32
    See application file for complete search history.

(56) References Cited

U.S. PATENT DOCUMENTS

| | | | | |
|---|---|---|---|---|
| 7,952,929 B2* | 5/2011 | Kim | ........................ | G11C 16/08 |
| | | | | 365/185.23 |
| 8,559,229 B2* | 10/2013 | Kim | ................... | G11C 16/0483 |
| | | | | 365/185.24 |
| 8,638,606 B2 | 1/2014 | Zhao et al. | | |
| 8,917,557 B2 | 12/2014 | Sakaguchi et al. | | |
| 8,952,426 B2 | 2/2015 | Maejima | | |
| 8,988,937 B2 | 3/2015 | Dunga et al. | | |
| 9,245,642 B1 | 1/2016 | Chen et al. | | |
| 9,437,305 B2* | 9/2016 | Lu | ........................ | G11C 16/0466 |
| 10,276,242 B2 | 4/2019 | Kimura | | |
| 10,541,033 B2 | 1/2020 | Jung et al. | | |
| 10,832,778 B1* | 11/2020 | Yang | ................... | G11C 16/3468 |
| 11,211,392 B1 | 12/2021 | Puthenthermadam et al. | | |
| 2010/0046300 A1* | 2/2010 | Sarin | ................... | G11C 11/5628 |
| | | | | 365/185.22 |
| 2010/0322011 A1* | 12/2010 | Edahiro | .............. | G11C 11/5642 |
| | | | | 365/182 |
| 2012/0081957 A1* | 4/2012 | Kim | ................... | G11C 11/5628 |
| | | | | 365/185.18 |
| 2013/0176790 A1* | 7/2013 | Nguyen | .............. | G11C 11/5628 |
| | | | | 365/185.19 |
| 2013/0322174 A1 | 12/2013 | Li et al. | | |
| 2015/0255166 A1* | 9/2015 | Tseng | ................. | G11C 16/0483 |
| | | | | 365/185.17 |
| 2021/0082897 A1* | 3/2021 | Okada | ..................... | H01L 24/09 |
| 2021/0391024 A1* | 12/2021 | Chen | ................... | G11C 16/3459 |
| 2022/0199175 A1* | 6/2022 | Lu | ............................ | G11C 16/32 |
| 2022/0392530 A1* | 12/2022 | Yang | ................... | G11C 16/3427 |
| 2023/0134907 A1* | 5/2023 | Lee | ........................ | G11C 16/08 |
| | | | | 365/185.11 |
| 2023/0207026 A1* | 6/2023 | Yang | ................... | G11C 11/5628 |
| | | | | 365/185.02 |
| 2024/0055059 A1* | 2/2024 | Guo | ................... | G11C 16/3427 |

\* cited by examiner

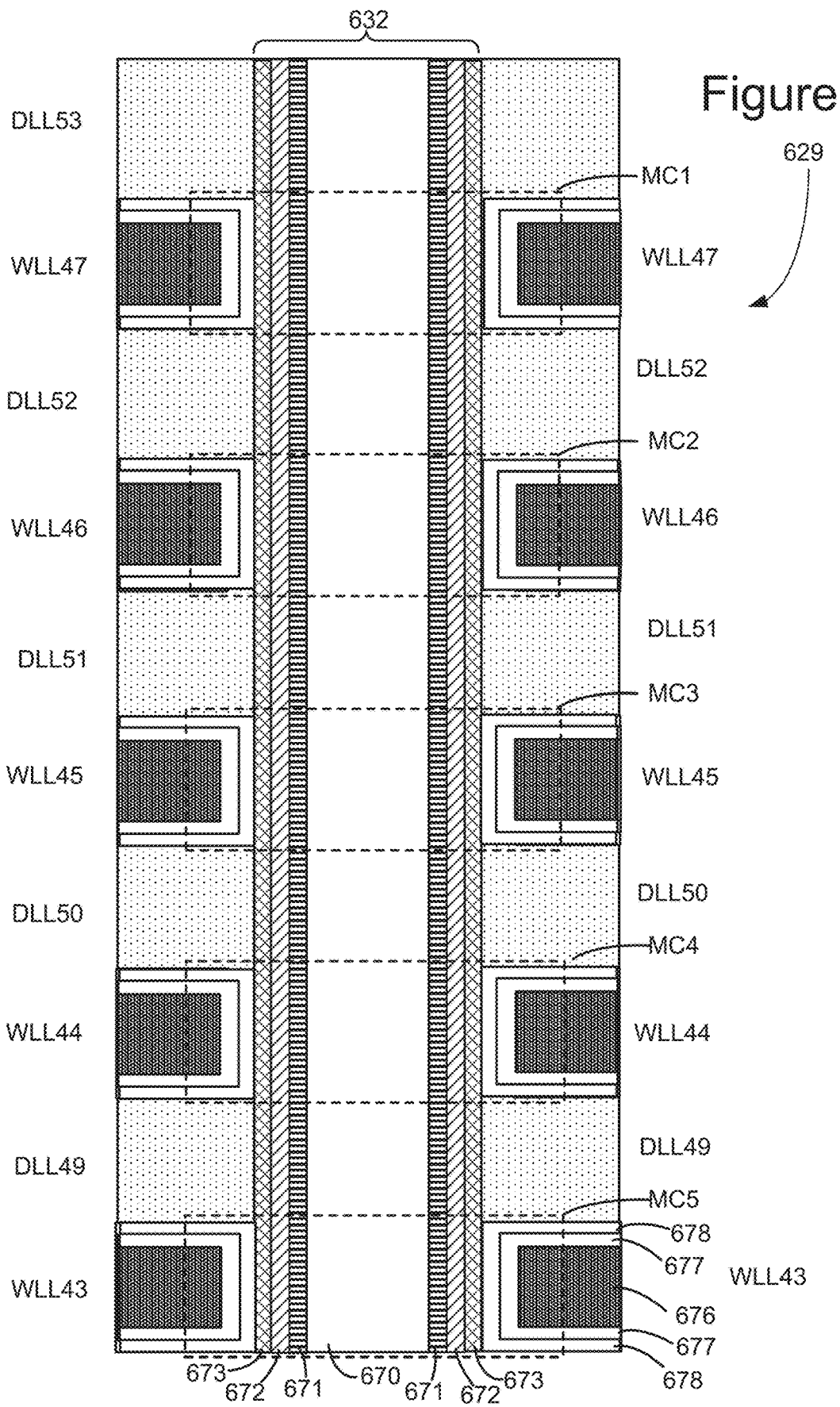

Figure 7A
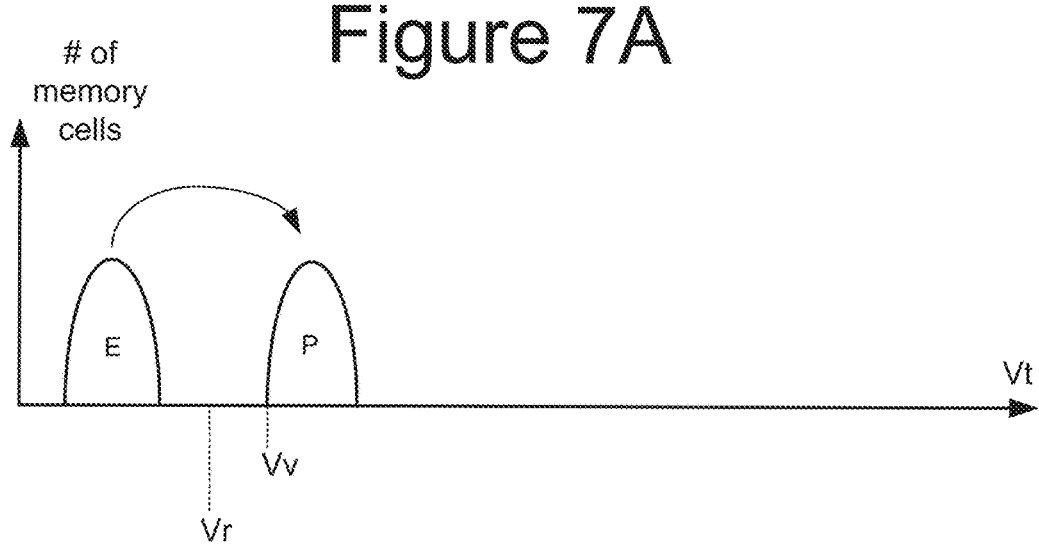
Figure 7B
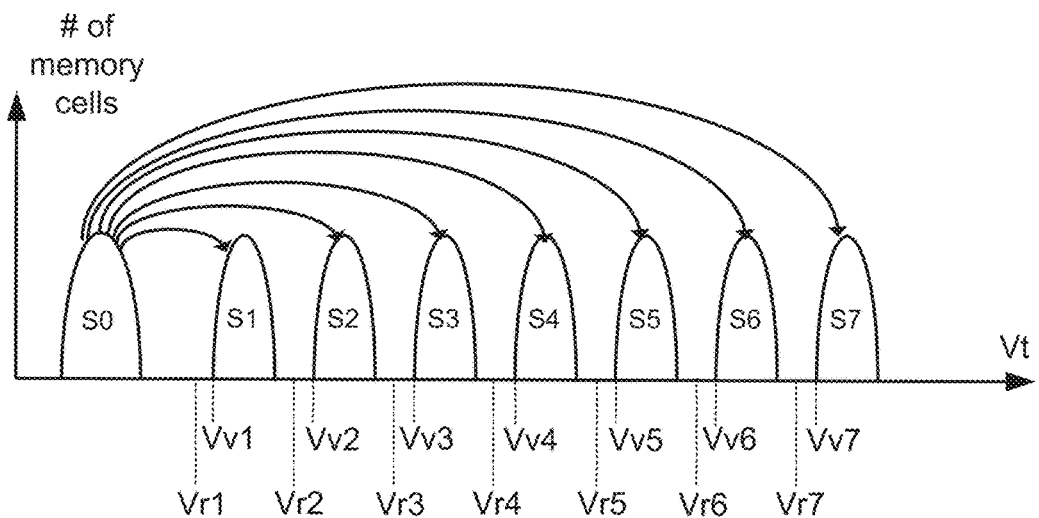
Figure 7C
|  | S0 | S1 | S2 | S3 | S4 | S5 | S6 | S7 |
|---|---|---|---|---|---|---|---|---|
| Upper Page | 1 | 1 | 1 | 0 | 0 | 0 | 0 | 1 |
| Middle Page | 1 | 1 | 0 | 0 | 1 | 1 | 0 | 0 |
| Lower Page | 1 | 0 | 0 | 0 | 0 | 1 | 1 | 1 |

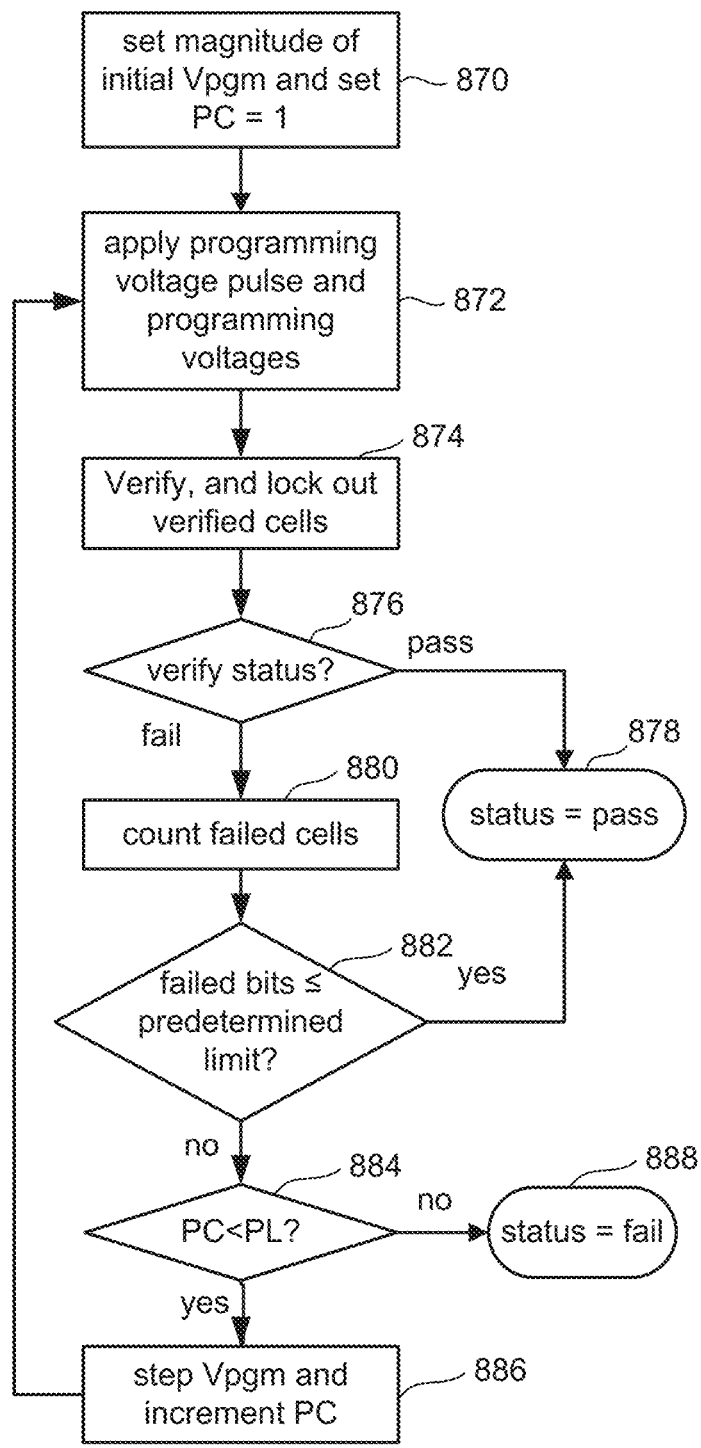

NEGATIVE WORD LINE ENABLED PRE-BOOSTING STRATEGY TO IMPROVE NAND PROGRAM PERFORMANCE

CLAIM OF PRIORITY

The present application claims priority from U.S. Provisional Patent Application No. 63/497,954, entitled "NEGATIVE WORD LINE ENABLED PRE-BOOSTING STRATEGY TO IMPROVE NAND PROGRAM PERFORMANCE," by Cao et al., filed Apr. 24, 2023, incorporated by reference herein in its entirety.

BACKGROUND

The present disclosure relates to technology for non-volatile storage.

Semiconductor memory is widely used in various electronic devices such as cellular telephones, digital cameras, personal digital assistants, medical electronics, mobile computing devices, servers, solid state drives, non-mobile computing devices and other devices. Semiconductor memory may comprise non-volatile memory or volatile memory. Non-volatile memory allows information to be stored and retained even when the non-volatile memory is not connected to a source of power (e.g., a battery). An example of non-volatile memory is flash memory (e.g., NAND-type and NOR-type flash memory). Users of non-volatile memory typically want the memory to operate at high speeds so that they do not need to wait for memory operations to be completed, but also want the memory to consume less power.

BRIEF DESCRIPTION OF THE DRAWINGS

Like-numbered elements refer to common components in the different figures.

FIG. 6E depicts a cross sectional view of region of FIG. 6D that includes a portion of a vertical column.

FIG. 7A depicts threshold voltage distributions of memory cells in a binary embodiment.

FIG. 7B depicts threshold voltage distributions of memory cells in a multi-level cell (MLC) embodiment.

FIG. 7C is a table describing one example of an assignment of data values to data states.

FIG. 8 is a flow chart describing one embodiment of a process for programming non-volatile memory.

FIG. 21 is a set of waveforms for an embodiment of the bias voltages of a programming loop in an embodiment using negative word line voltage pre-boosting and by-word line discharge when used in NAND memory having a lateral sub-block arrangement.

DETAILED DESCRIPTION

When programming NAND memory, important considerations are write speed and accuracy, as well as minimizing the amount that writing data along one word line disturbs data previously written on other word lines of a memory block. Once technique for improving the accuracy of NAND programming operations is to use a channel pre-charge to boost the channel voltage under a selected memory cell before applying a programming pulse. However, the typical channel pre-charge can consume a significant proportion of the time used in each loop in a program operation, adversely affecting memory performance. The typical implementation of channel pre-charge can also cause relatively high levels of program disturb, particularly in NAND memory embodiments that can be operated in a sub-block mode.

To improve programming performance in NAND memory, while maintaining programming accuracy and reducing program disturb, the channel pre-charge phase before a programming pulse can be eliminated. Instead, a read recovery phase after the program verify directly discharges a selected word line from the verify voltage to a negative word line voltage, with non-selected word lines being directly discharged from the read bypass voltage to the negative word line voltage. From the negative word line voltage, the word lines are then ramped up to ground and then on the bias levels of the following programming pulse. These conditions can drive electrons from the charge storage region of the selected memory cell, resulting in a high degree of channel boosting and much less program disturb. Variations of the technique can be applied to NAND memory operable in a sub-block mode where it can be difficult to use the typical channel pre-charge.

FIGS. 1A-6F describe one example of a storage system that can be used to implement the technology disclosed herein.

Figure 1A:
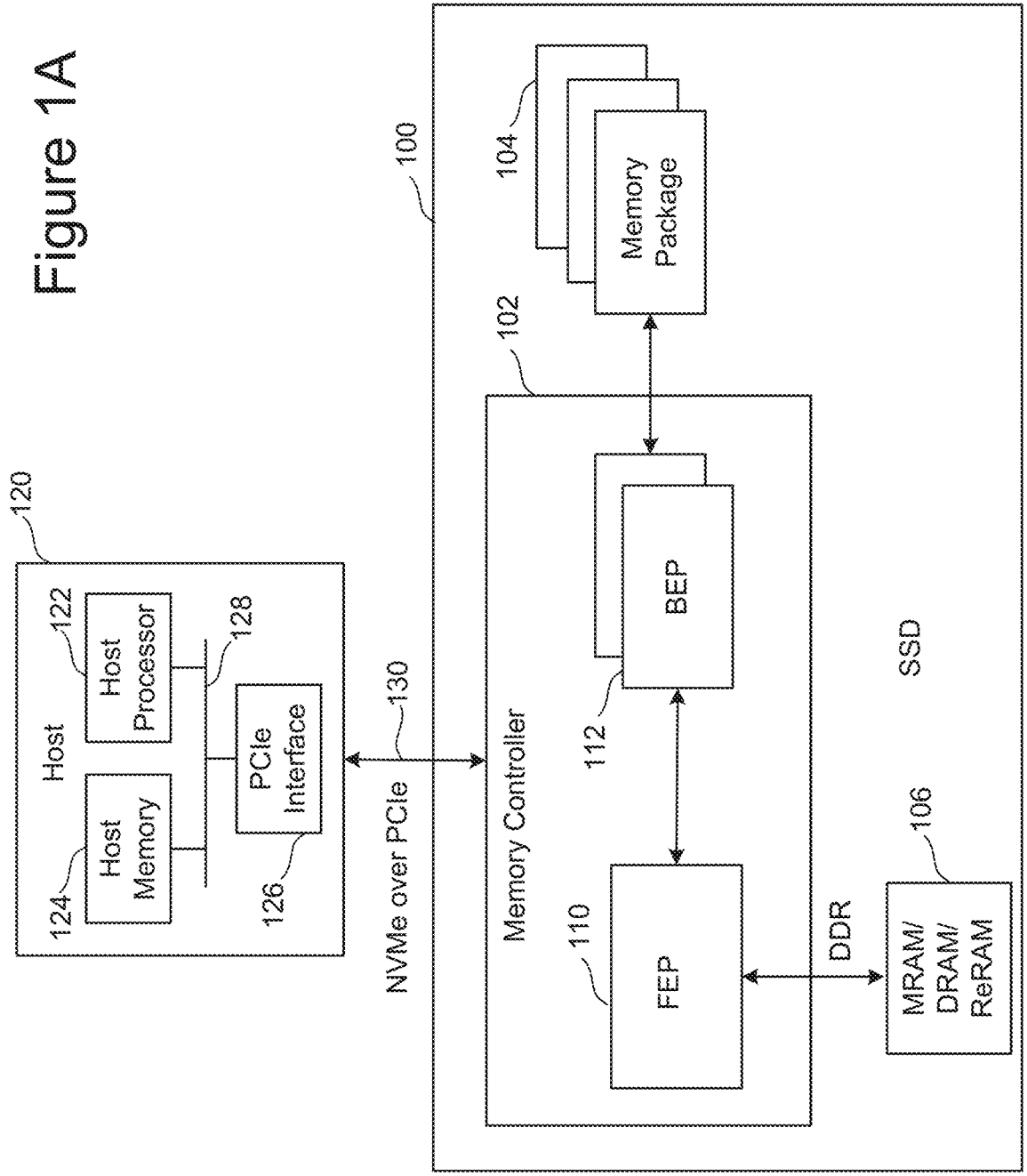
FIG. 1A is a block diagram of one embodiment of a storage system connected to a host.

FIG. 1A is a block diagram of one embodiment of a storage system 100 connected to a host system 120. Storage system 100 can implement the technology disclosed herein. Many different types of storage systems can be used with the technology disclosed herein. One example storage system is a solid state drive ("SSD"); however, other types of storage systems can also be used. Storage system 100 comprises a memory controller 102, memory package 104 for storing data, and local memory (e.g., MRAM/DRAM/ReRAM) 106. Memory controller 102 comprises a Front End Processor Circuit (FEP) 110 and one or more Back End Processor Circuits (BEP) 112. In one embodiment FEP 110 circuit is implemented on an ASIC. In one embodiment, each BEP circuit 112 is implemented on a separate ASIC. The ASICs for each of the BEP circuits 112 and the FEP circuit 110 are implemented on the same semiconductor such that the memory controller 102 is manufactured as a System on a Chip ("SoC"). FEP 110 and BEP 112 both include their own processors. In one embodiment, FEP 110 and BEP 112 work as a master slave configuration where the FEP 110 is the master and each BEP 112 is a slave. For example, FEP circuit 110 implements a flash translation layer that performs memory management (e.g., garbage collection, wear leveling, etc.), logical to physical address translation, communication with the host, management of DRAM (local volatile memory) and management of the overall operation of the SSD (or other non-volatile storage system). The BEP circuit 112 manages memory operations in the memory package 104 at the request of FEP circuit 110. For example, the BEP circuit 112 can carry out the read, erase and programming processes. Additionally, the BEP circuit 112 can perform buffer management, set specific voltage levels required by the FEP circuit 110, perform error correction (ECC), control the Toggle Mode interfaces to the memory packages, etc. In one embodiment, each BEP circuit 112 is responsible for its own set of memory packages. Memory controller 102 is one example of a control circuit.

In one embodiment, there are a plurality of memory packages 104. Each memory package 104 may contain one or more memory dies. In one embodiment, each memory die in the memory package 104 utilizes NAND flash memory (including two dimensional NAND flash memory and/or three dimensional NAND flash memory). In other embodiments, the memory package 104 can include other types of memory; for example, the memory package can include Phase Change Memory (PCM) memory.

In one embodiment, memory controller 102 communicates with host system 120 using an interface 130 that implements NVM Express (NVMe) over PCI Express (PCIe). For working with storage system 100, host system 120 includes a host processor 122, host memory 124, and a PCIe interface 126, which communicate over bus 128. Host memory 124 is the host's physical memory, and can be DRAM, SRAM, non-volatile memory or another type of storage. Host system 120 is external to and separate from storage system 100. In one embodiment, storage system 100 is embedded in host system 120. In other embodiments, the controller 102 may communicate with host 120 via other types of communication buses and/or links, including for example, over an NVMe over Fabrics architecture, or a cache/memory coherence architecture based on Cache Coherent Interconnect for Accelerators (CCIX), Compute Express Link (CXL), Open Coherent Accelerator Processor Interface (OpenCAPI), Gen-Z and the like. For simplicity, the example embodiments below will be described with respect to a PCIe example.

Figure 1B:
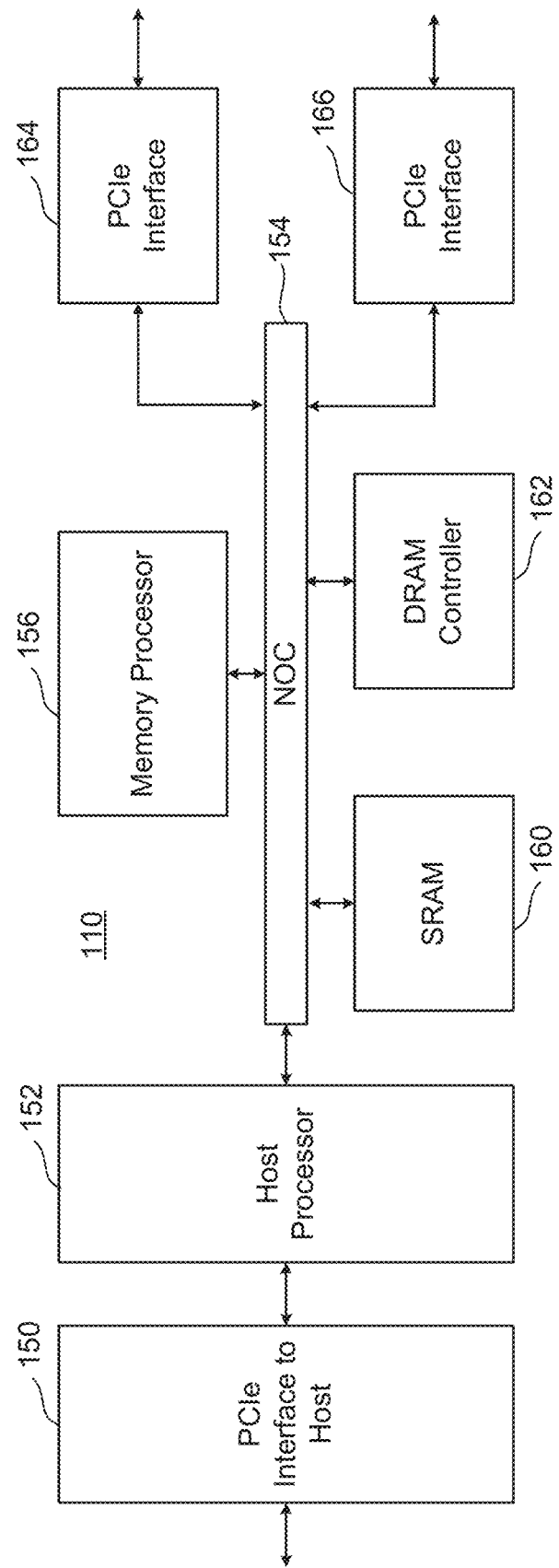
FIG. 1B is a block diagram of one embodiment of a Front End Processor Circuit.

FIG. 1B is a block diagram of one embodiment of FEP circuit 110. FIG. 1B shows a PCIe interface 150 to communicate with host system 120 and a host processor 152 in communication with that PCIe interface. The host processor 152 can be any type of processor known in the art that is suitable for the implementation. Host processor 152 is in communication with a network-on-chip (NOC) 154. A NOC is a communication subsystem on an integrated circuit, typically between cores in a SoC. NOC's can span synchronous and asynchronous clock domains or use un-clocked asynchronous logic. NOC technology applies networking theory and methods to on-chip communications and brings notable improvements over conventional bus and crossbar interconnections. NOC improves the scalability of SoCs and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). Connected to and in communication with NOC 154 is the memory processor 156, SRAM 160 and a DRAM controller 162. The DRAM controller 162 is used to operate and communicate with the local memory 106 (e.g., DRAM/MRAM/ReRAM). SRAM 160 is local RAM memory used by memory processor 156. Memory processor 156 is used to run the FEP circuit and perform the various memory operations. Also in communication with the NOC are two PCIe Interfaces 164 and 166. In the embodiment of FIG. 1B, memory controller 102 includes two BEP circuits 112; therefore, there are two PCIe Interfaces 164/166. Each PCIe Interface communicates with one of the BEP circuits 112. In other embodiments, there can be more or fewer than two BEP circuits 112; therefore, there can be more than two PCIe Interfaces.

Figure 2A:
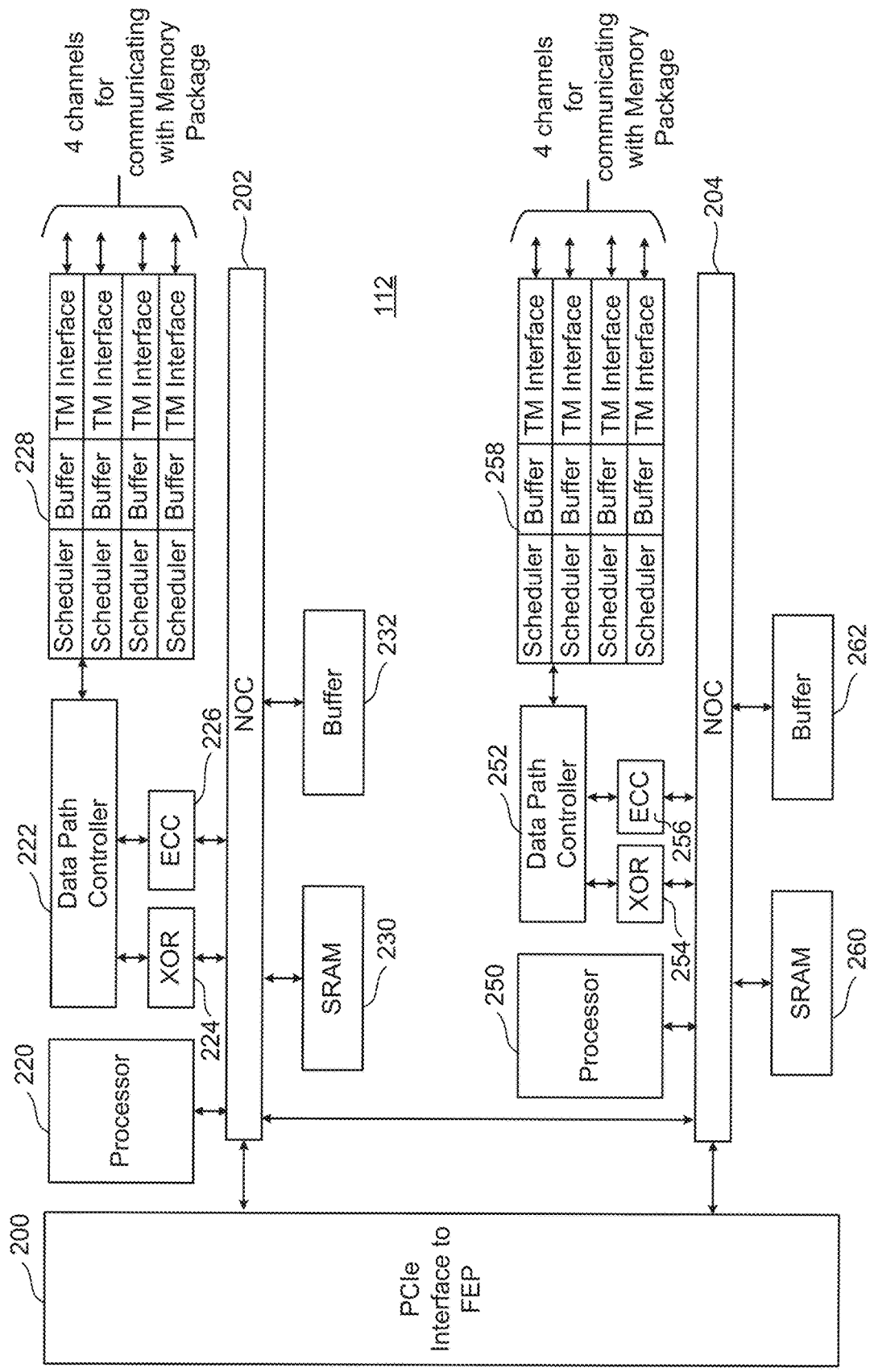
FIG. 2A is a block diagram of one embodiment of a Back End Processor Circuit.

FIG. 2A is a block diagram of one embodiment of the BEP circuit 112. FIG. 2A shows a PCIe Interface 200 for communicating with the FEP circuit 110 (e.g., communicating with one of PCIe Interfaces 164 and 166 of FIG. 1B). PCIe Interface 200 is in communication with two NOCs 202 and 204. In one embodiment the two NOCs can be combined to one large NOC. Each NOC (202/204) is connected to SRAM (230/260), a buffer (232/262), processor (220/250), and a data path controller (222/252) via an XOR engine (224/254), an ECC engine (226/256).

The ECC engines 226/256 are used to perform error correction, as known in the art. Herein, the ECC engines 226/256 may be referred to as controller ECC engines. The XOR engines 224/254 are used to XOR the data so that data can be combined and stored in a manner that can be recovered in case there is a programming error. In an embodiment, the XOR engines 224/254 are able to recover data that cannot be decoded using ECC engine 226/256.

Data path controller 222 is connected to a memory interface 228 for communicating via four channels with integrated memory assemblies. Thus, the top NOC 202 is associated with memory interface 228 for four channels for communicating with integrated memory assemblies and the bottom NOC 204 is associated with memory interface 258 for four additional channels for communicating with integrated memory assemblies. In one embodiment, each memory interface 228/258 includes four Toggle Mode interfaces (TM Interface), four buffers and four schedulers. There is one scheduler, buffer and TM Interface for each of the channels. The processor can be any standard processor known in the art. The data path controllers 222/252 can be a processor, FPGA, microprocessor or other type of controller. The XOR engines 224/254 and ECC engines 226/256 are dedicated hardware circuits, known as hardware accelerators. In other embodiments, the XOR engines 224/254, ECC engines 226/256 can be implemented in software. The scheduler, buffer, and TM Interfaces are hardware circuits. In other embodiments, the memory interface (an electrical circuit for communicating with memory dies) can be a different structure than depicted in FIG. 2A. Additionally, controllers with structures different than FIGS. 1B and 2A can also be used with the technology described herein.

Figure 2B:
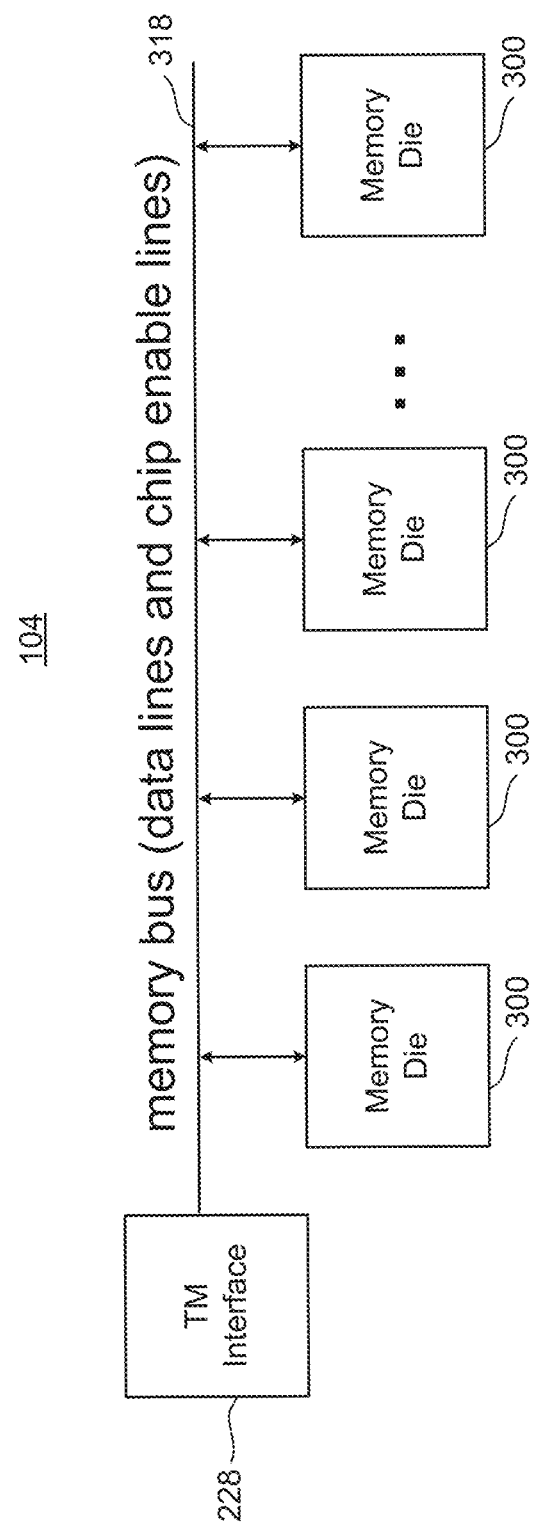
FIG. 2B is a block diagram of one embodiment of a memory package.

FIG. 2B is a block diagram of one embodiment of a memory package 104 that includes a plurality of memory dies 300 connected to a memory bus (data lines and chip enable lines) 318. The memory bus 318 connects to a Toggle Mode Interface 228 for communicating with the TM Interface of a BEP circuit 112 (see e.g., FIG. 2A). In some embodiments, the memory package can include a small controller connected to the memory bus and the TM Interface. In total, the memory package 104 may have eight or sixteen memory die; however, other numbers of memory die can also be implemented. The technology described herein is not limited to any particular number of memory die. In some embodiments, the memory package can also include a processor, CPU device, such as a RISC-V CPU along with some amount of RAM to help implement some of capabilities described below. The technology described herein is not limited to any particular number of memory die.

Figure 3A:
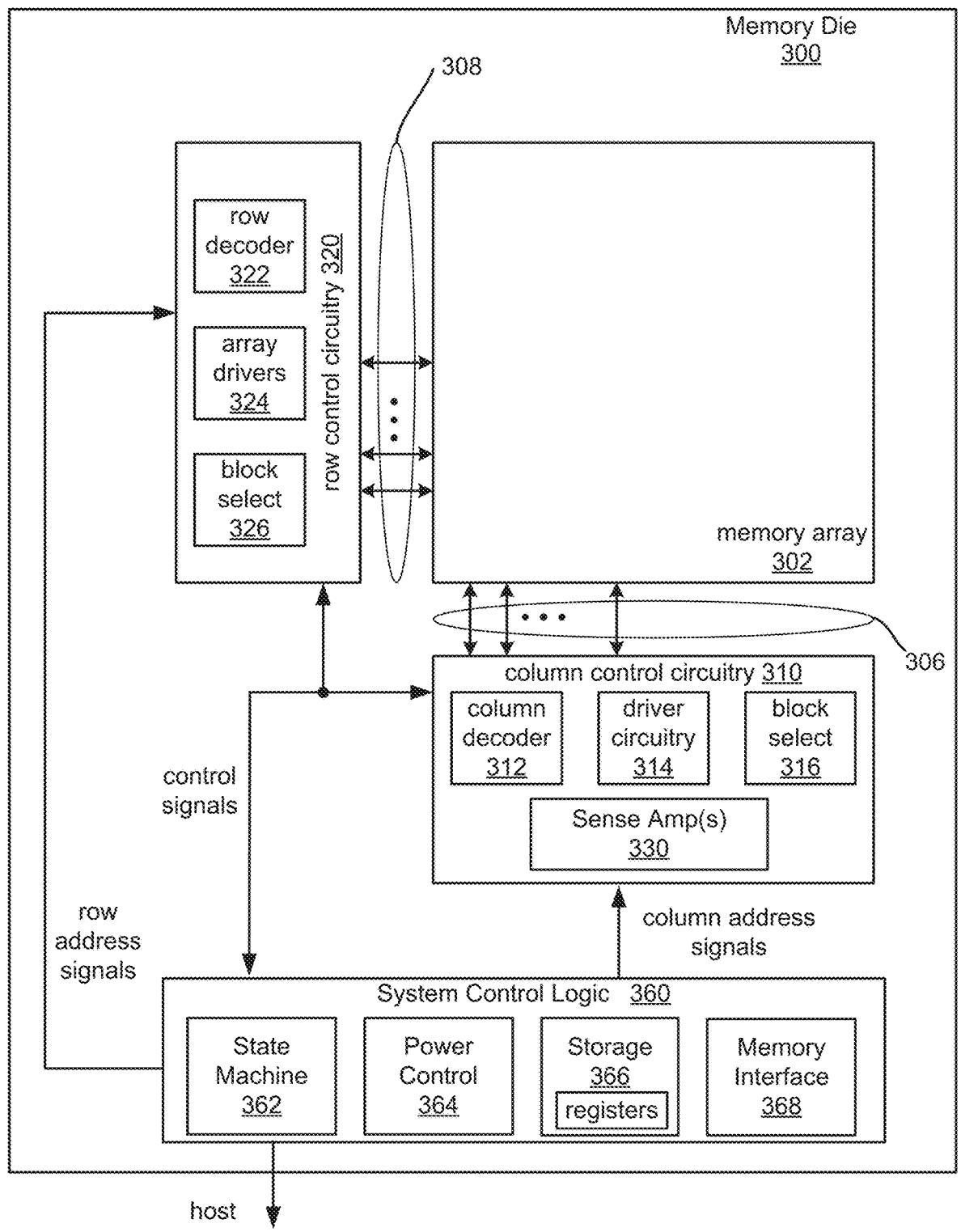
FIG. 3A is a functional block diagram of an embodiment of a memory die.

FIG. 3A is a block diagram that depicts one example of a memory die 300 that can implement the technology described herein. Memory die 300, which can correspond to one of the memory die 300 of FIG. 2B, includes a memory array 302 that can include any of memory cells described in the following. The array terminal lines of memory array 302 include the various layer(s) of word lines organized as rows, and the various layer(s) of bit lines organized as columns. However, other orientations can also be implemented. Memory die 300 includes row control circuitry 320, whose outputs 308 are connected to respective word lines of the memory array 302. Row control circuitry 320 receives a group of M row address signals and one or more various control signals from System Control Logic circuit 360, and typically may include such circuits as row decoders 322, array terminal drivers 324, and block select circuitry 326 for both reading and writing operations. Row control circuitry 320 may also include read/write circuitry. Memory die 300 also includes column control circuitry 310 including sense amplifier(s) 330 whose input/outputs 306 are connected to respective bit lines of the memory array 302. Although only a single block is shown for array 302, a memory die can include multiple arrays that can be individually accessed. Column control circuitry 310 receives a group of N column address signals and one or more various control signals from System Control Logic 360, and typically may include such circuits as column decoders 312, array terminal receivers or drivers 314, block select circuitry 316, as well as read/write circuitry, and I/O multiplexers.

System control logic 360 receives data and commands from a host and provides output data and status to the host. In other embodiments, system control logic 360 receives data and commands from a separate controller circuit and provides output data to that controller circuit, with the controller circuit communicating with the host. In some embodiments, the system control logic 360 can include a state machine 362 that provides die-level control of memory operations. In one embodiment, the state machine 362 is programmable by software. In other embodiments, the state machine 362 does not use software and is completely implemented in hardware (e.g., electrical circuits). In another embodiment, the state machine 362 is replaced by a micro-controller or microprocessor, either on or off the memory chip. The system control logic 360 can also include a power control module 364 controls the power and voltages supplied to the rows and columns of the memory 302 during memory operations and may include charge pumps and regulator circuit for creating regulating voltages. System control logic 360 includes storage 366, which may be used to store parameters for operating the memory array 302.

Commands and data are transferred between the controller 102 and the memory die 300 via memory controller interface 368 (also referred to as a "communication interface"). Memory controller interface 368 is an electrical interface for communicating with memory controller 102. Examples of memory controller interface 368 include a Toggle Mode Interface and an Open NAND Flash Interface (ONFI). Other I/O interfaces can also be used. For example, memory controller interface 368 may implement a Toggle Mode Interface that connects to the Toggle Mode interfaces of memory interface 228/258 for memory controller 102. In one embodiment, memory controller interface 368 includes a set of input and/or output (I/O) pins that connect to the controller 102.

In some embodiments, all of the elements of memory die 300, including the system control logic 360, can be formed as part of a single die. In other embodiments, some or all of the system control logic 360 can be formed on a different die.

For purposes of this document, the phrase "one or more control circuits" can include a controller, a state machine, a micro-controller, micro-processor, and/or other control circuitry as represented by the system control logic 360, or other analogous circuits that are used to control non-volatile memory.

In one embodiment, memory structure 302 comprises a three dimensional memory array of non-volatile memory cells in which multiple memory levels are formed above a single substrate, such as a wafer. The memory structure may comprise any type of non-volatile memory that are monolithically formed in one or more physical levels of memory cells having an active area disposed above a silicon (or other type of) substrate. In one example, the non-volatile memory cells comprise vertical NAND strings with charge-trapping.

In another embodiment, memory structure 302 comprises a two dimensional memory array of non-volatile memory cells. In one example, the non-volatile memory cells are NAND flash memory cells utilizing floating gates. Other types of memory cells (e.g., NOR-type flash memory) can also be used.

The exact type of memory array architecture or memory cell included in memory structure 302 is not limited to the examples above. Many different types of memory array architectures or memory technologies can be used to form memory structure 302. No particular non-volatile memory technology is required for purposes of the new claimed embodiments proposed herein. Other examples of suitable technologies for memory cells of the memory structure 302 include ReRAM memories (resistive random access memories), magnetoresistive memory (e.g., MRAM, Spin Transfer Torque MRAM, Spin Orbit Torque MRAM), FeRAM, phase change memory (e.g., PCM), and the like. Examples of suitable technologies for memory cell architectures of the memory structure 302 include two dimensional arrays, three dimensional arrays, cross-point arrays, stacked two dimensional arrays, vertical bit line arrays, and the like.

One example of a ReRAM cross-point memory includes reversible resistance-switching elements arranged in cross-point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Another example is magnetoresistive random access memory (MRAM) that stores data by magnetic storage elements. The elements are formed from two ferromagnetic layers, each of which can hold a magnetization, separated by a thin insulating layer. One of the two layers is a permanent magnet set to a particular polarity; the other layer's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. In other PCM embodiments, the memory cells are programmed by current pulses. Note that the use of "pulse" in this document does not require a square pulse but includes a (continuous or non-continuous) vibration or burst of sound, current, voltage light, or other wave. These memory elements within the individual selectable memory cells, or bits, may include a further series element that is a selector, such as an ovonic threshold switch or metal insulator substrate.

A person of ordinary skill in the art will recognize that the technology described herein is not limited to a single specific memory structure, memory construction or material composition, but covers many relevant memory structures within the spirit and scope of the technology as described herein and as understood by one of ordinary skill in the art.

The elements of FIG. 3A can be grouped into two parts, the structure of memory structure 302 of the memory cells and the peripheral circuitry, including all of the other elements. An important characteristic of a memory circuit is its capacity, which can be increased by increasing the area of the memory die of memory system 100 that is given over to the memory structure 302; however, this reduces the area of the memory die available for the peripheral circuitry. This can place quite severe restrictions on these peripheral elements. For example, the need to fit sense amplifier circuits within the available area can be a significant restriction on sense amplifier design architectures. With respect to the system control logic 360, reduced availability of area can limit the available functionalities that can be implemented on-chip. Consequently, a basic trade-off in the design of a memory die for the memory system 100 is the amount of area to devote to the memory structure 302 and the amount of area to devote to the peripheral circuitry.

Another area in which the memory structure 302 and the peripheral circuitry are often at odds is in the processing involved in forming these regions, since these regions often involve differing processing technologies and the trade-off in having differing technologies on a single die. For example, when the memory structure 302 is NAND flash, this is an NMOS structure, while the peripheral circuitry is often CMOS based. For example, elements such sense amplifier circuits, charge pumps, logic elements in a state machine, and other peripheral circuitry in system control logic 360 often employ PMOS devices. Processing operations for manufacturing a CMOS die will differ in many aspects from the processing operations optimized for an NMOS flash NAND memory or other memory cell technologies.

To improve upon these limitations, embodiments described below can separate the elements of FIG. 3A onto separately formed dies that are then bonded together. More specifically, the memory structure 302 can be formed on one die and some or all of the peripheral circuitry elements, including one or more control circuits, can be formed on a separate die. For example, a memory die can be formed of just the memory elements, such as the array of memory cells of flash NAND memory, MRAM memory, PCM memory, ReRAM memory, or other memory type. Some or all of the peripheral circuitry, even including elements such as decoders and sense amplifiers, can then be moved on to a separate die. This allows each of the memory die to be optimized individually according to its technology. For example, a NAND memory die can be optimized for an NMOS based memory array structure, without worrying about the CMOS elements that have now been moved onto a separate peripheral circuitry die that can be optimized for CMOS processing. This allows more space for the peripheral elements, which can now incorporate additional capabilities that could not be readily incorporated were they restricted to the margins of the same die holding the memory cell array. The two die can then be bonded together in a bonded multi-die memory circuit, with the array on the one die connected to the periphery elements on the other memory circuit. Although the following will focus on a bonded memory circuit of one memory die and one peripheral circuitry die, other embodiments can use more die, such as two memory die and one peripheral circuitry die, for example.

Figure 3B:
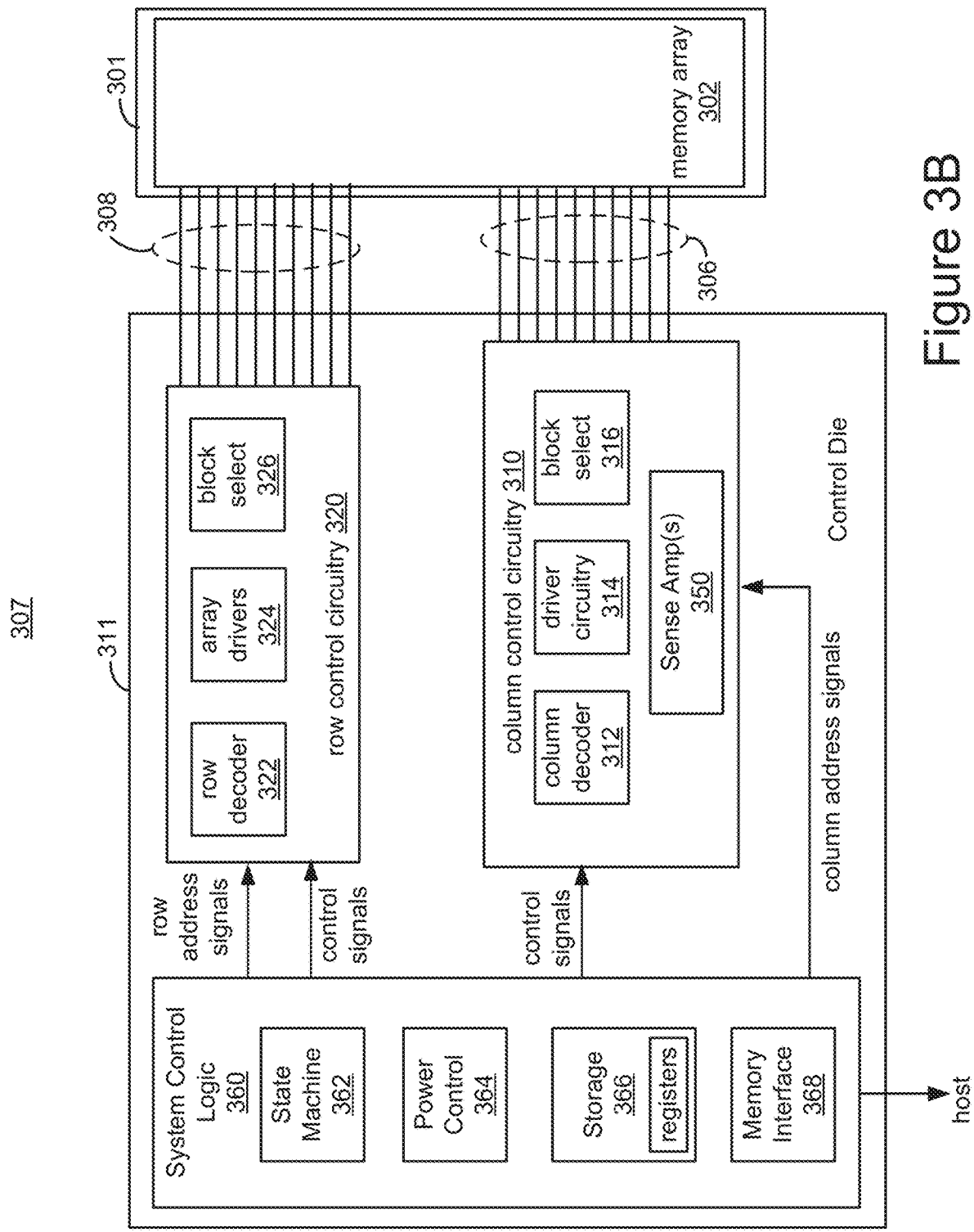
FIG. 3B is a functional block diagram of an embodiment of an integrated memory assembly.

FIG. 3B shows an alternative arrangement to that of FIG. 3A which may be implemented using wafer-to-wafer bonding to provide a bonded die pair. FIG. 3B depicts a functional block diagram of one embodiment of an integrated memory assembly 307. The integrated memory assembly 307 may be used in a memory package 104 in storage system 100. The integrated memory assembly 307 includes two types of semiconductor die (or more succinctly, "die"). Memory structure die 301 includes memory structure 302. Memory structure 302 may contain non-volatile memory cells. Control die 311 includes control circuitry 360, 310, 320. In some embodiments, the control die 311 is configured to connect to the memory structure 302 in the memory structure die 301. In some embodiments, the memory structure die 301 and the control die 311 are bonded together.

FIG. 3B shows an example of the peripheral circuitry, including control circuits, formed in a peripheral circuit or control die 311 coupled to memory structure 302 formed in memory structure die 301. Common components are labelled similarly to FIG. 3A. It can be seen that system control logic 360, row control circuitry 320, and column control circuitry 310 are located in control die 311. In some embodiments, all or a portion of the column control circuitry 310 and all or a portion of the row control circuitry 320 are located on the memory structure die 301. In some embodiments, some of the circuitry in the system control logic 360 is located on the on the memory structure die 301.

System control logic 360, row control circuitry 320, and column control circuitry 310 may be formed by a common process (e.g., CMOS process), so that adding elements and functionalities, such as ECC, more typically found on a memory controller 102 may require few or no additional process steps (i.e., the same process steps used to fabricate controller 102 may also be used to fabricate system control logic 360, row control circuitry 320, and column control circuitry 310). Thus, while moving such circuits from a die such as memory structure die 301 may reduce the number of steps needed to fabricate such a die, adding such circuits to a die such as control die 311 may not require any additional process steps. The control die 311 could also be referred to as a CMOS die, due to the use of CMOS technology to implement some or all of control circuitry 360, 310, 320.

FIG. 3B shows column control circuitry 310 including sense amplifier(s) 350 on the control die 311 coupled to memory structure 302 on the memory structure die 301 through electrical paths 306. For example, electrical paths 306 may provide electrical connection between column decoder 312, driver circuitry 314, and block select 316 and bit lines of memory structure 302. Electrical paths may extend from column control circuitry 310 in control die 311 through pads on control die 311 that are bonded to corresponding pads of the memory structure die 301, which are connected to bit lines of memory structure 302. Each bit line of memory structure 302 may have a corresponding electrical path in electrical paths 306, including a pair of bond pads, which connects to column control circuitry 310. Similarly, row control circuitry 320, including row decoder 322, array drivers 324, and block select 326 are coupled to memory structure 302 through electrical paths 308. Each of electrical path 308 may correspond to a word line, dummy word line, or select gate line. Additional electrical paths may also be provided between control die 311 and memory structure die 301.

For purposes of this document, the phrase "one or more control circuits" can include one or more of controller 102, system control logic 360, column control circuitry 310, row control circuitry 320, a micro-controller, a state machine, and/or other control circuitry, or other analogous circuits that are used to control non-volatile memory. The one or more control circuits can include hardware only or a combination of hardware and software (including firmware). For example, a controller programmed by firmware to perform the functions described herein is one example of a control circuit. A control circuit can include a processor, FGA, ASIC, integrated circuit, or other type of circuit.

Figure 4:
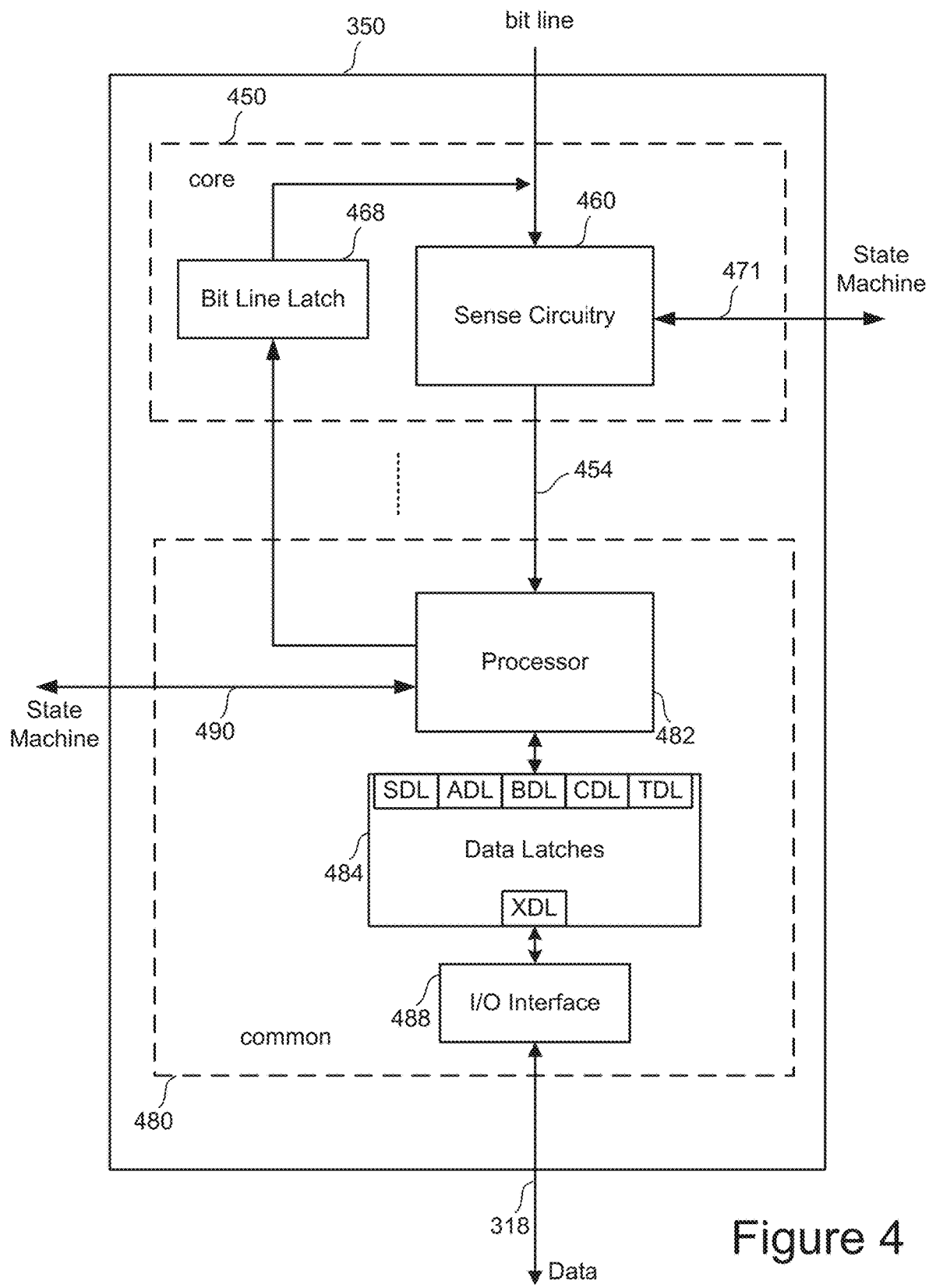
FIG. 4 is a block diagram of an individual sense block partitioned into a core portion and a common portion.

FIG. 4 is a block diagram of an individual sense block of sense amplifiers 350 partitioned into a core portion, referred to as a sense module 480, and a common portion 480. In one embodiment, there will be a separate sense module 450 for each bit line and one common portion 480 for a set of multiple sense modules 450. In one example, a sense block will include one common portion 480 and eight sense, twelve, or sixteen modules 450. Each of the sense modules in a group will communicate with the associated common portion via a data bus 454.

Sense module 450 comprises sense circuitry 460 that determines whether a conduction current in a connected bit line is above or below a predetermined level or, in voltage based sensing, whether a voltage level in a connected bit line is above or below a predetermined level. The sense circuitry 460 is to receive control signals from the state machine via input lines 471. In some embodiments, sense module 450 includes a circuit commonly referred to as a sense amplifier. Sense module 450 also includes a bit line latch 468 that is used to set a voltage condition on the connected bit line. For example, a predetermined state latched in bit line latch 468 will result in the connected bit line being pulled to a state designating program inhibit (e.g., Vdd).

Common portion 480 comprises a processor 482, a set of data latches 484 and an I/O Interface 488 coupled between the set of data latches 484 and data bus 318. Processor 482 performs computations. For example, one of its functions is to determine the data stored in the sensed memory cell and store the determined data in the set of data latches. The set of data latches 484 is used to store data bits determined by processor 482 during a read operation. It is also used to store data bits imported from the data bus 318 during a program operation. The imported data bits represent write data meant to be programmed into the memory. I/O interface 488 provides an interface between data latches 484 and the data bus 318.

During read or sensing, the operation of the system is under the control of state machine 362 that controls (using power control 364) the supply of different control gate or other bias voltages to the addressed memory cell(s). As it steps through the various predefined control gate voltages corresponding to the various memory states supported by the memory, the sense module 450 may trip at one of these voltages and an output will be provided from sense module 450 to processor 482 via bus 454. At that point, processor 482 determines the resultant memory state by consideration of the tripping event(s) of the sense module and the information about the applied control gate voltage from the state machine via input lines 490. It then computes a binary encoding for the memory state and stores the resultant data bits into data latches 484. In another embodiment of the core portion, bit line latch 468 serves double duty, both as a latch for latching the output of the sense module 450 and also as a bit line latch as described above.

Data latch stack 484 contains a stack of data latches corresponding to the sense module. In one embodiment, there are three, four or another number of data latches per sense module 450. In one embodiment, the latches are each one bit. In this document, the latches in one embodiment of data latch stack 484 will be referred to as SDL, XDL, ADL, BDL, and CDL. In the embodiments discussed here, the latch XDL is a transfer latch used to exchange data with the I/O interface 488. In addition to a first sense amp data latch SDL, the additional latches ADL, BDL and CDL can be used to hold multi-state data, where the number of such latches typically reflects the number of bits stored in a memory cell. For example, in 3-bit per cell multi-level cell (MLC) memory format, the three sets of latches ADL, BDL, CDL can be used for upper, middle, lower page data. In a 2-bit per cell embodiment, only ADL and BDL might be used, while a 4-bit per cell MLC embodiment might include a further set of DDL latches. In other embodiments, the XDL latches can be used to hold additional pages of data, such as a 4-bit per cell MLC embodiment the uses the XDL latches in addition to the three sets of latches ADL, BDL, CDL for four pages of data. The following discussion will mainly focus on a 3-bit per cell embodiment, as this can illustrate the main features but not get overly complicated, but the discussion can also be applied to embodiments with more or fewer bit per cell formats. Some embodiments many also include additional latches for particular functions, such as represented by the TDL latch where, for example, this could be used in "quick pass write" operations where it is used in program operations for when a memory cell is approaching its target state and is partially inhibited to slow its programming rate.

For example, in some embodiments data read from a memory cell or data to be programmed into a memory cell will first be stored in XDL. In case the data is to be programmed into a memory cell, the system can program the data into the memory cell from XDL. In one embodiment, the data is programmed into the memory cell entirely from XDL before the next operation proceeds. In other embodiments, as the system begins to program a memory cell through XDL, the system also transfers the data stored in XDL into ADL in order to reset XDL. Before data is transferred from XDL into ADL, the data kept in ADL is transferred to BDL, flushing out whatever data (if any) is being kept in BDL, and similarly for BDL and CDL. Once data has been transferred from XDL into ADL, the system continues (if necessary) to program the memory cell through ADL, while simultaneously loading the data to be programmed into a memory cell on the next word line into XDL, which has been reset. By performing the data load and programming operations simultaneously, the system can save time and thus perform a sequence of such operations faster.

During program or verify, the data to be programmed is stored in the set of data latches 484 from the data bus 318. During the verify process, processor 482 monitors the verified memory state relative to the desired memory state. When the two are in agreement, processor 482 sets the bit line latch 468 so as to cause the bit line to be pulled to a state designating program inhibit. This inhibits the memory cell coupled to the bit line from further programming even if it is subjected to programming pulses on its control gate. In other embodiments the processor initially loads the bit line latch 468 and the sense circuitry sets it to an inhibit value during the verify process.

In some implementations (but not required), the data latches are implemented as a shift register so that the parallel data stored therein is converted to serial data for data bus 318, and vice versa. In one embodiment, all the data latches corresponding to the read/write block of m memory cells can be linked together to form a block shift register so that a block of data can be input or output by serial transfer. In particular, the bank of read/write modules is adapted so that each of its set of data latches will shift data in to or out of the data bus in sequence as if they are part of a shift register for the entire read/write block.

Figure 5A:
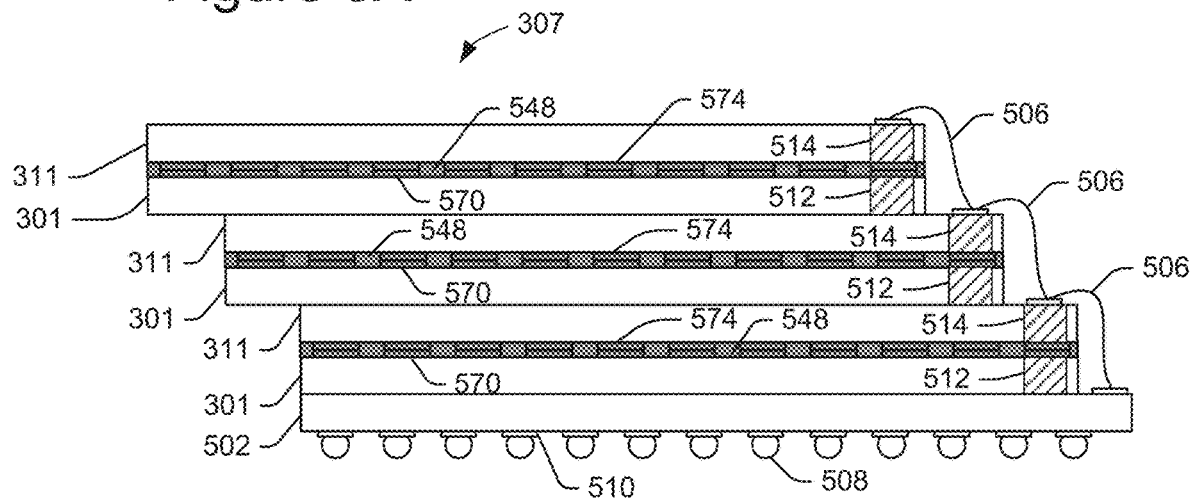
FIG. 5A depicts a side view of an embodiment of an integrated memory assembly stacked on a substrate.

In some embodiments, there is more than one control die 311 and more than one memory structure die 301 in an integrated memory assembly 307. In some embodiments, the integrated memory assembly 307 includes a stack of multiple control die 311 and multiple memory structure die 301. FIG. 5A depicts a side view of an embodiment of an integrated memory assembly 307 stacked on a substrate 502 (e.g., a stack comprising control dies 311 and memory structure dies 301). The integrated memory assembly 307 has three control dies 311 and three memory structure dies 301. In some embodiments, there are more than three memory structure dies 301 and more than three control die 311.

Each control die 311 is affixed (e.g., bonded) to at least one of the memory structure dies 301. Some of the bond pads 570, 574, are depicted. There may be many more bond pads. A space between two dies 301, 311 that are bonded together is filled with a solid layer 548, which may be formed from epoxy or other resin or polymer. This solid layer 548 protects the electrical connections between the dies 301, 311, and further secures the dies together. Various materials may be used as solid layer 548, but in embodiments, it may be Hysol epoxy resin from Henkel Corp., having offices in California, USA.

The integrated memory assembly 307 may for example be stacked with a stepped offset, leaving the bond pads at each level uncovered and accessible from above. Wire bonds 506 connected to the bond pads connect the control die 311 to the substrate 502. A number of such wire bonds may be formed across the width of each control die 311 (i.e., into the page of FIG. 5A).

A memory structure die through silicon via (TSV) 512 may be used to route signals through a memory structure die 301. A control die through silicon via (TSV) 514 may be used to route signals through a control die 311. The TSVs 512, 514 may be formed before, during or after formation of the integrated circuits in the semiconductor dies 301, 311. The TSVs may be formed by etching holes through the wafers. The holes may then be lined with a barrier against metal diffusion. The barrier layer may in turn be lined with a seed layer, and the seed layer may be plated with an electrical conductor such as copper, although other suitable materials such as aluminum, tin, nickel, gold, doped polysilicon, and alloys or combinations thereof may be used.

Solder balls 508 may optionally be affixed to contact pads 510 on a lower surface of substrate 502. The solder balls 508 may be used to electrically and mechanically couple the integrated memory assembly 307 to a host device such as a printed circuit board. Solder balls 508 may be omitted where the integrated memory assembly 307 is to be used as an LGA package. The solder balls 508 may form a part of the interface between the integrated memory assembly 307 and the memory controller 102.

Figure 5B:
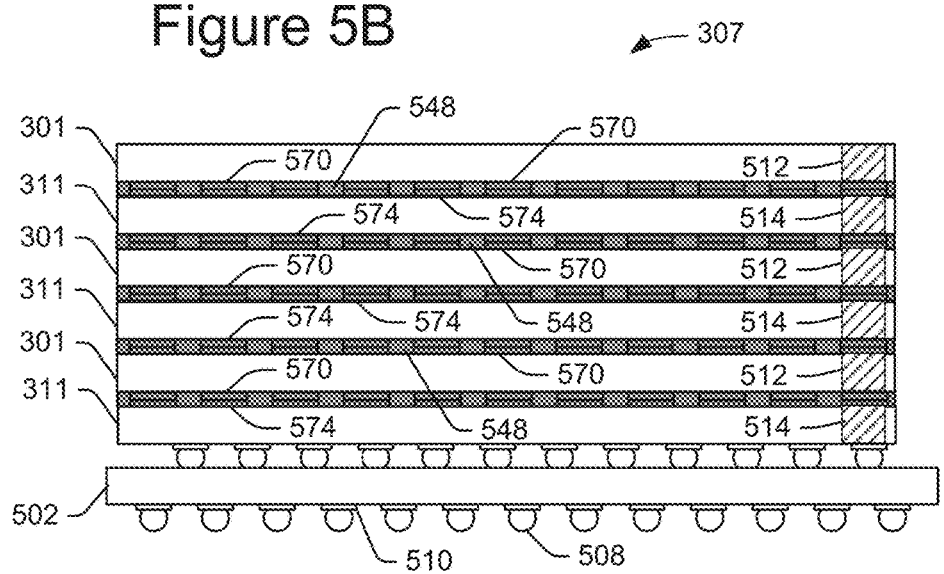
FIG. 5B depicts a side view of an embodiment of an integrated memory assembly stacked on a substrate.

FIG. 5B depicts a side view of an embodiment of an integrated memory assembly 307 stacked on a substrate 502. The integrated memory assembly 307 has three control die 311 and three memory structure die 301. In some embodiments, there are many more than three memory structure dies 301 and many more than three control dies 311. In this example, each control die 311 is bonded to at least one memory structure die 301. Optionally, a control die 311 may be bonded to two memory structure die 301.

Some of the bond pads 570, 574 are depicted. There may be many more bond pads. A space between two dies 301, 311 that are bonded together is filled with a solid layer 548, which may be formed from epoxy or other resin or polymer. In contrast to the example in FIG. 5A, the integrated memory assembly 307 in FIG. 5B does not have a stepped offset. A memory structure die through silicon via (TSV) 512 may be used to route signals through a memory structure die 301. A control die through silicon via (TSV) 514 may be used to route signals through a control die 311.

As has been briefly discussed above, the control die 311 and the memory structure die 301 may be bonded together. Bond pads on each die 301, 311 may be used to bond the two dies together. In some embodiments, the bond pads are bonded directly to each other, without solder or other added material, in a so-called Cu-to-Cu bonding process. In a Cu-to-Cu bonding process, the bond pads are controlled to be highly planar and formed in a highly controlled environment largely devoid of ambient particulates that might otherwise settle on a bond pad and prevent a close bond. Under such properly controlled conditions, the bond pads are aligned and pressed against each other to form a mutual bond based on surface tension. Such bonds may be formed at room temperature, though heat may also be applied. In embodiments using Cu-to-Cu bonding, the bond pads may be about 5 μm square and spaced from each other with a pitch of 5 μm to 5 μm. While this process is referred to herein as Cu-to-Cu bonding, this term may also apply even where the bond pads are formed of materials other than Cu.

When the area of bond pads is small, it may be difficult to bond the semiconductor dies together. The size of, and pitch between, bond pads may be further reduced by providing a film layer on the surfaces of the semiconductor dies including the bond pads. The film layer is provided around the bond pads. When the dies are brought together, the bond pads may bond to each other, and the film layers on the respective dies may bond to each other. Such a bonding technique may be referred to as hybrid bonding. In embodiments using hybrid bonding, the bond pads may be about 5 μm square and spaced from each other with a pitch of 1 μm to 5 μm. Bonding techniques may be used providing bond pads with even smaller sizes and pitches.

Some embodiments may include a film on surface of the dies 301, 311. Where no such film is initially provided, a space between the dies may be under filled with an epoxy or other resin or polymer. The under-fill material may be applied as a liquid which then hardens into a solid layer. This under-fill step protects the electrical connections between the dies 301, 311, and further secures the dies together. Various materials may be used as under-fill material, but in embodiments, it may be Hysol epoxy resin from Henkel Corp., having offices in California, USA.

Figure 6A:
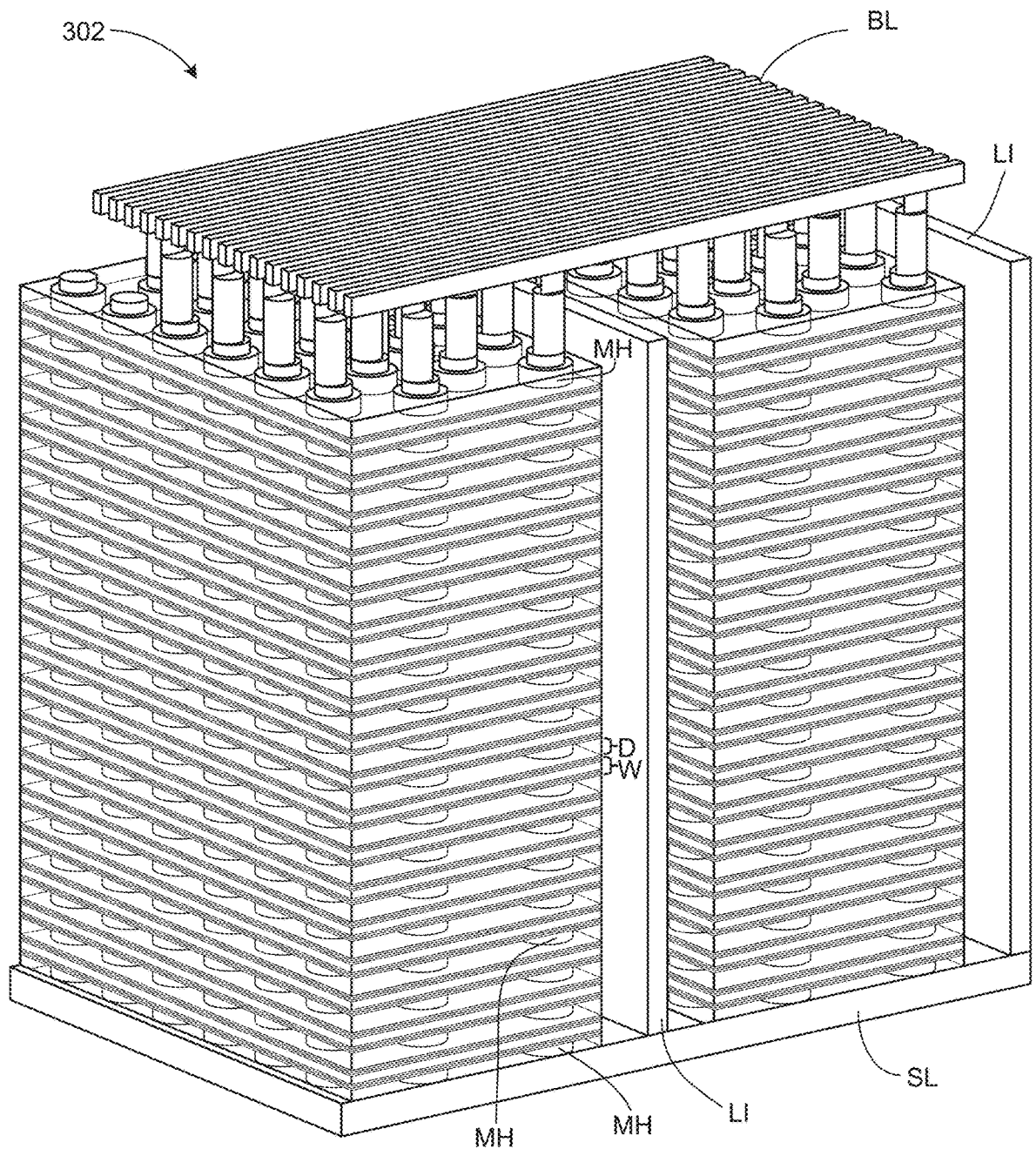
FIG. 6A is a perspective view of a portion of one example embodiment of a monolithic three dimensional memory array that can comprise memory structure.

FIG. 6A is a perspective view of a portion of one example embodiment of a monolithic three dimensional memory array that can comprise memory structure 302, which includes a plurality non-volatile memory cells. For example, FIG. 6A shows a portion of one block comprising memory. The structure depicted includes a set of bit lines BL positioned above a stack of alternating dielectric layers and conductive layers with vertical columns of materials extending through the dielectric layers and conductive layers. For example purposes, one of the dielectric layers is marked as D and one of the conductive layers (also called word line layers) is marked as W. The word line layers contain one or more word lines that are connected to memory cells. For example, a word line may be connected to a control gate of a memory cell. The number of alternating dielectric layers and conductive layers can vary based on specific implementation requirements. One set of embodiments includes between 108-304 alternating dielectric layers and conductive layers. One example embodiment includes 96 data word line layers, 8 select layers, 6 dummy word line layers and 110 dielectric layers. More or fewer than 108-304 layers can also be used. The alternating dielectric layers and conductive layers are divided into four "fingers" or sub-blocks by local interconnects LI, in an embodiment. FIG. 6A shows two fingers and two local interconnects LI. Below the alternating dielectric layers and word line layers is a source line layer SL. Vertical columns of materials (also known as memory holes) are formed in the stack of alternating dielectric layers and conductive layers. For example, one of the vertical columns/memory holes is marked as MH. Note that in FIG. 6A, the dielectric layers are depicted as see-through so that the reader can see the memory holes positioned in the stack of alternating dielectric layers and conductive layers. In one embodiment, NAND strings are formed by filling the vertical column/memory hole with materials including a charge-trapping material to create a vertical column of memory cells. Each memory cell can store one or more bits of data.

Figure 6B:
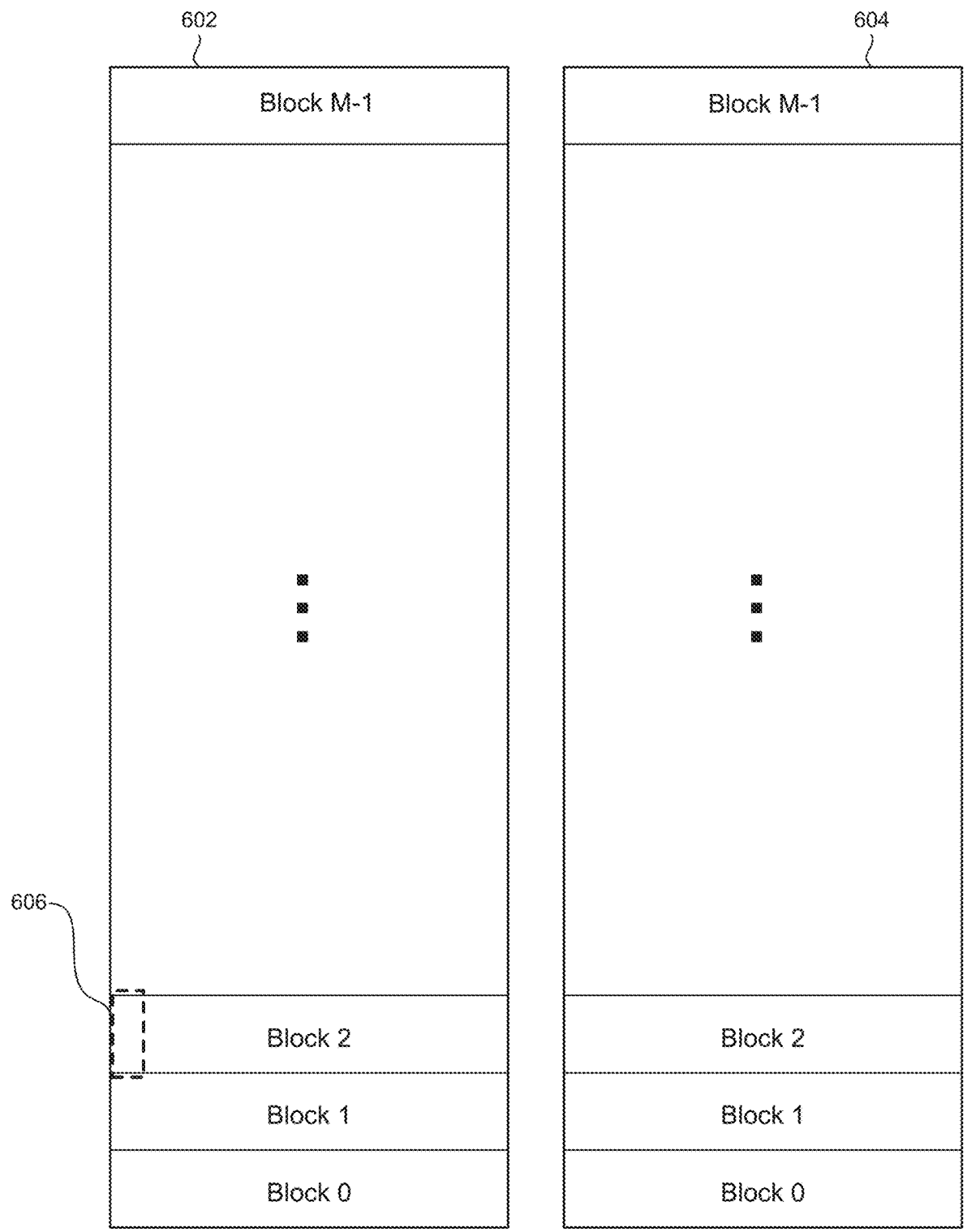
FIG. 6B is a block diagram explaining one example organization of memory structure.

FIG. 6B is a block diagram explaining one example organization of memory structure 302, which is divided into two planes 602 and 604. Each plane is then divided into M blocks. In one example, each plane has about 2000 blocks. However, different numbers of blocks and planes can also be used. In one embodiment, for two plane memory, the block IDs are usually such that even blocks belong to one plane and odd blocks belong to another plane; therefore, plane 602 includes block 0, 2, 4, 6, . . . and plane 604 includes blocks 1, 3, 5, 7, . . . . In on embodiment, a block of memory cells is a unit of erase. That is, all memory cells of a block are erased together. In other embodiments, memory cells can be grouped into blocks for other reasons, such as to organize the memory structure 302 to enable the signaling and selection circuits.

Figure 6C:
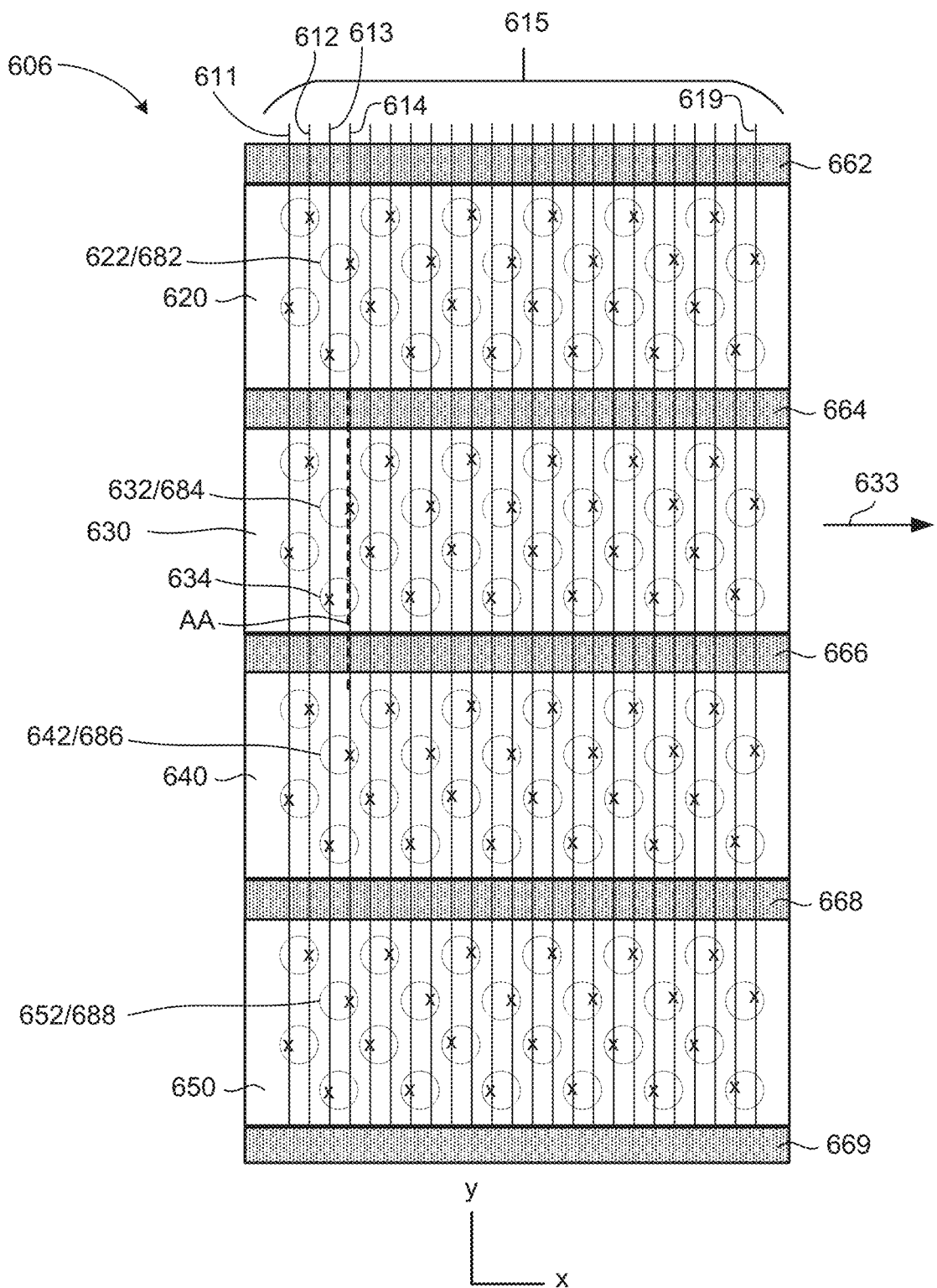
FIG. 6C is a block diagram depicting a top view of a portion of one block from the memory structure.
Figure 6D:
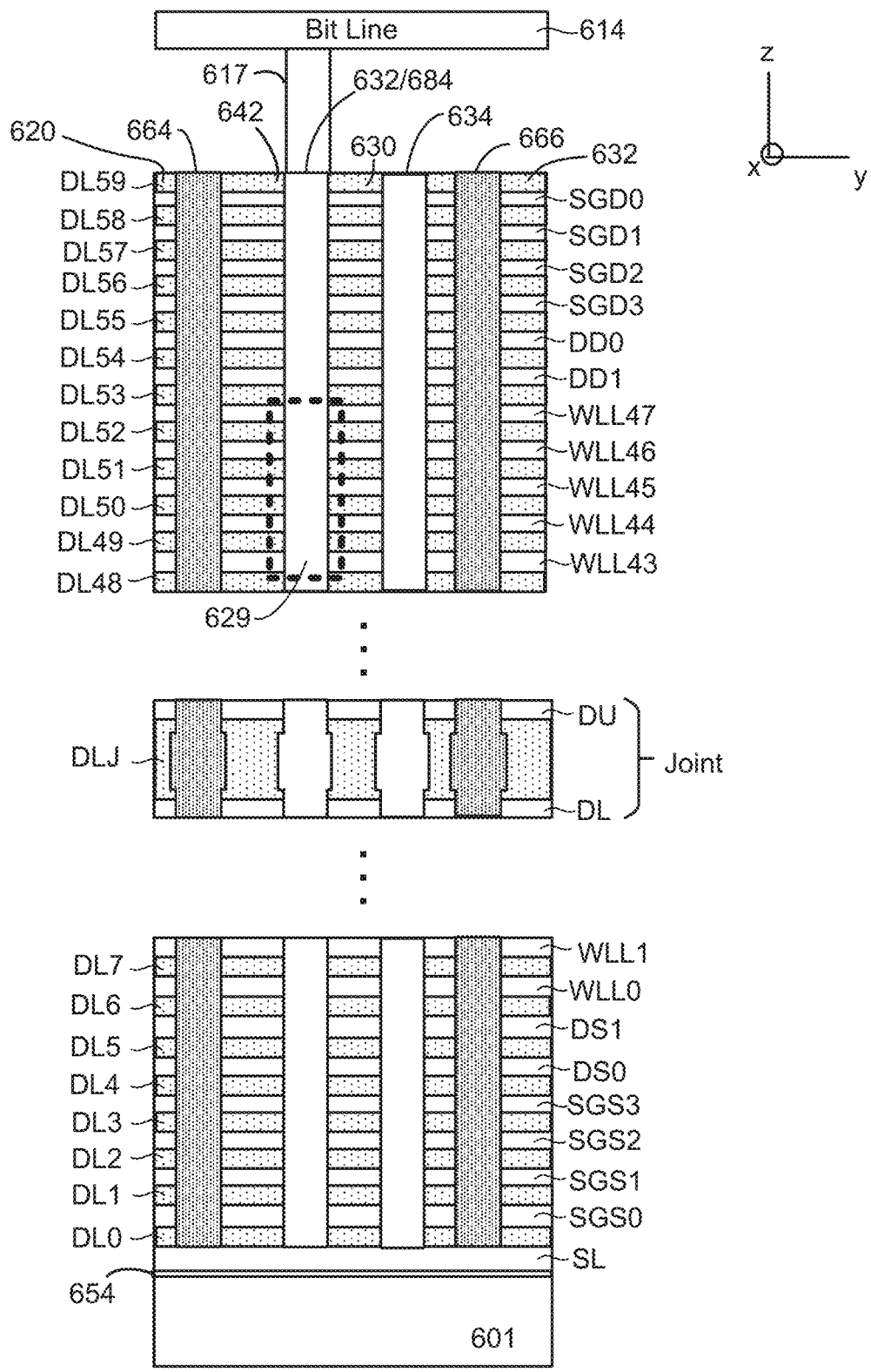
FIG. 6D depicts a portion of an embodiment of three dimensional memory structure showing a cross-sectional view along line AA of FIG. 6C.

FIGS. 6C-6E depict an example 3D NAND structure. FIG. 6C is a block diagram depicting a top view of a portion of one block from memory structure 302. The portion of the block depicted in FIG. 6C corresponds to portion 606 in block 2 of FIG. 6B. As can be seen from FIG. 6C, the block depicted in FIG. 6C extends in the direction of 633. In one embodiment, the memory array will have 60 layers. Other embodiments have less than or more than 60 layers. However, FIG. 6C only shows the top layer.

FIG. 6C depicts a plurality of circles that represent the vertical columns. Each of the vertical columns include multiple select transistors and multiple memory cells. In one embodiment, each vertical column implements a NAND string. For example, FIG. 6C depicts vertical columns 622, 632, 642 and 652. Vertical column 622 implements NAND string 682. Vertical column 632 implements NAND string 684. Vertical column 642 implements NAND string 686. Vertical column 652 implements NAND string 688. More details of the vertical columns are provided below. Since the block depicted in FIG. 6C extends in the direction of arrow 633 and in the direction of arrow 633, the block includes more vertical columns than depicted in FIG. 6C.

FIG. 6C also depicts a set of bit lines 615, including bit lines 611, 612, 613, 614, . . . 619. FIG. 6C shows twenty-four bit lines because only a portion of the block is depicted. It is contemplated that more than twenty-four bit lines connected to vertical columns of the block. Each of the circles representing vertical columns has an "x" to indicate its connection to one bit line. For example, bit line 614 is connected to vertical columns 622, 632, 642 and 652.

The block depicted in FIG. 6C includes a set of local interconnects 662, 664, 666, 668 and 669 that connect the various layers to a source line below the vertical columns. Local interconnects 662, 664, 666, 668 and 669 also serve to divide each layer of the block into four regions; for example, the top layer depicted in FIG. 6C is divided into regions 620, 630, 640 and 650, which are referred to as fingers or sub-blocks. In the layers of the block that implement memory cells, the four regions are referred to as word line sub-blocks that are separated by the local interconnects. In one embodiment, the word line sub-blocks on a common level of a block connect together at the end of the block to form a single word line. In another embodiment, the word line sub-blocks on the same level are not connected together. In one example implementation, a bit line only connects to one vertical column in each of regions 620, 630, 640 and 650. In that implementation, each block has sixteen rows of active columns and each bit line connects to four rows in each block. In one embodiment, all of four rows connected to a common bit line are connected to the same word line (via different word line sub-blocks on the same level that are connected together). Therefore, the system uses the source side select lines and the drain side select lines to choose one (or another subset) of the four to be subjected to a memory operation (program, verify, read, and/or erase).

Although FIG. 6C shows each region having four rows of vertical columns, four regions and sixteen rows of vertical columns in a block, those exact numbers are an example implementation. Other embodiments may include more or fewer regions per block, more or fewer rows of vertical columns per region and more or fewer rows of vertical columns per block.

FIG. 6C also shows the vertical columns being staggered. In other embodiments, different patterns of staggering can be used. In some embodiments, the vertical columns are not staggered.

FIG. 6D depicts a portion of an embodiment of three dimensional memory structure 302 showing a cross-sectional view along line AA of FIG. 6C. This cross sectional view cuts through vertical columns 632 and 634 and region 630 (see FIG. 6C). The structure of FIG. 6D includes: four drain side select layers SGD0, SGD1, SGD2 and SGD3; four source side select layers SGS0, SGS1, SGS2 and SGS3; four dummy word line layers DD0, DD1, DS0 and DS1; and forty eight data word line layers WLL0-WLL47 for connecting to data memory cells. Other embodiments can implement more or fewer than four drain side select layers, more or fewer than four source side select layers, more or fewer than four dummy word line layers, and more or fewer than forty eight word line layers (e.g., 96 word line layers). Vertical columns 632 and 634 are depicted protruding through the drain side select layers, source side select layers, dummy word line layers and word line layers. In one embodiment, each vertical column comprises a NAND string. For example, vertical column 632 comprises NAND string 684. Below the vertical columns and the layers listed below is substrate 601, an insulating film 654 on the substrate, and source line SL. The NAND string of vertical column 632 has a source end at the bottom of the stack and a drain end at the top of the stack. As in agreement with FIG. 6C, FIG. 6D show vertical column 632 connected to Bit Line 614 via connector 617. Local interconnects 664 and 666 are also depicted.

For ease of reference, drain side select layers SGD0, SGD1, SGD2 and SGD3; source side select layers SGS0, SGS1, SGS2 and SGS3; dummy word line layers DD0, DD1, DS0 and DS1; and word line layers WLL0-WLL47 collectively are referred to as the conductive layers. In one embodiment, the conductive layers are made from a combination of TiN and tungsten. In other embodiments, other materials can be used to form the conductive layers, such as doped polysilicon, metal such as tungsten or metal silicide. In some embodiments, different conductive layers can be formed from different materials. Between conductive layers are dielectric layers DL0-DL59. For example, dielectric layers DL49 is above word line layer WLL43 and below word line layer WLL44. In one embodiment, the dielectric layers are made from $SiO_2$. In other embodiments, other dielectric materials can be used to form the dielectric layers.

The non-volatile memory cells are formed along vertical columns which extend through alternating conductive and dielectric layers in the stack. In one embodiment, the memory cells are arranged in NAND strings. The word line layer WLL0-WLL47 connect to memory cells (also called data memory cells). Dummy word line layers DD0, DD1, DS0 and DS1 connect to dummy memory cells. A dummy memory cell does not store user data, while a data memory cell is eligible to store user data. Drain side select layers SGD0, SGD1, SGD2 and SGD3 are used to electrically connect and disconnect NAND strings from bit lines. Source side select layers SGS0, SGS1, SGS2 and SGS3 are used to electrically connect and disconnect NAND strings from the source line SL.

In some embodiments, the word lines are read sequentially, which means that the word lines are read either from low to high (e.g., WLL0 to WLL47) or from high to low (e.g., WLL47 to WLL0). It is not required to read the entire set of word lines when reading sequentially. Techniques are disclosed herein for providing compensation for interference caused by adjacent memory cells on target memory cells during a sequential read.

In some embodiments, the read of an individual word line is broken down into separate reads of sub-blocks. Referring again to FIG. 6C, the block is divided into four sub-blocks 620, 630, 640, 650. Thus, the four sub-blocks on one word line layer may be read, prior to reading the four sub-blocks on an adjacent word line layer. In some embodiments, data state information is used to provide compensation on a sub-block basis. For example, data state information for memory cells at WLL35 is kept for each of the four sub-blocks 620-650. Then, when reading sub-block 620 at WLL36 the data state information for sub-block 620 at WLL35 is used to compensate for interference from adjacent memory cells in sub-block 620 at WLL35, when reading sub-block 630 at WLL36 the data state information for sub-block 630 at WLL35 is used to compensate for interference from adjacent memory cells in sub-block 620 at WLL35, etc.

For three dimensional NAND memory arrays having large numbers of word lines, one or more joint regions may be included. The use of a joint can simply the fabrication process and, in some embodiments, allow for sub-block level operations by accessing word lines only above or below the joint. The joint region will often have thicker dielectric region DLJ than between other word lines. As with the source and drain ends, one or more dummy word lines may be included above (DU) and below (DL) the joint.

FIG. 6E depicts a cross sectional view of region 629 of FIG. 6D that includes a portion of vertical column 632. In one embodiment, the vertical columns are round and include four layers; however, in other embodiments more or less than four layers can be included and other shapes can be used. In one embodiment, vertical column 632 includes an inner core layer 670 that is made of a dielectric, such as $SiO_2$. Other materials can also be used. Surrounding inner core 670 is polysilicon channel 671. Materials other than polysilicon can also be used. Note that it is the channel 671 that connects to the bit line. Surrounding channel 671 is a tunneling dielectric 672. In one embodiment, tunneling dielectric 672 has an ONO structure. Surrounding tunneling dielectric 672 is charge trapping layer 673, such as (for example) Silicon Nitride. Other memory materials and structures can also be used. The technology described herein is not limited to any particular material or structure.

FIG. 6E depicts dielectric layers DLL49, DLL50, DLL51, DLL52 and DLL53, as well as word line layers WLL43, WLL44, WLL45, WLL46, and WLL47. Each of the word line layers includes a word line region 676 surrounded by an aluminum oxide layer 677, which is surrounded by a blocking oxide ($SiO_2$) layer 678. The physical interaction of the word line layers with the vertical column forms the memory cells. Thus, a memory cell, in one embodiment, comprises channel 671, tunneling dielectric 672, charge trapping layer 673, blocking oxide layer 678, aluminum oxide layer 677 and word line region 676. For example, word line layer WLL47 and a portion of vertical column 632 comprise a memory cell MC1. Word line layer WLL46 and a portion of vertical column 632 comprise a memory cell MC2. Word line layer WLL45 and a portion of vertical column 632 comprise a memory cell MC3. Word line layer WLL44 and a portion of vertical column 632 comprise a memory cell MC4. Word line layer WLL43 and a portion of vertical column 632 comprise a memory cell MC5. In other architectures, a memory cell may have a different structure; however, the memory cell would still be the storage unit.

Note that the charge trapping layer 673 may extend from one end of the NAND string to the other, and hence may be referred to herein as a continuous charge trapping layer. When a memory cell is programmed, electrons are stored in a portion of the charge trapping layer 673 which is associated with the memory cell. These electrons are drawn into the charge trapping layer 673 from the channel 671, through the tunneling dielectric 672, in response to an appropriate voltage on word line region 676. The Vt of a memory cell is increased in proportion to the amount of stored charge. In one embodiment, the programming is achieved through Fowler-Nordheim tunneling of the electrons into the charge trapping layer. During an erase operation, the electrons return to the channel or holes are injected into the charge trapping layer to recombine with electrons. In one embodiment, erasing is achieved using hole injection into the charge trapping layer via a physical mechanism such as gate induced drain leakage (GIDL).

Figure 6F:
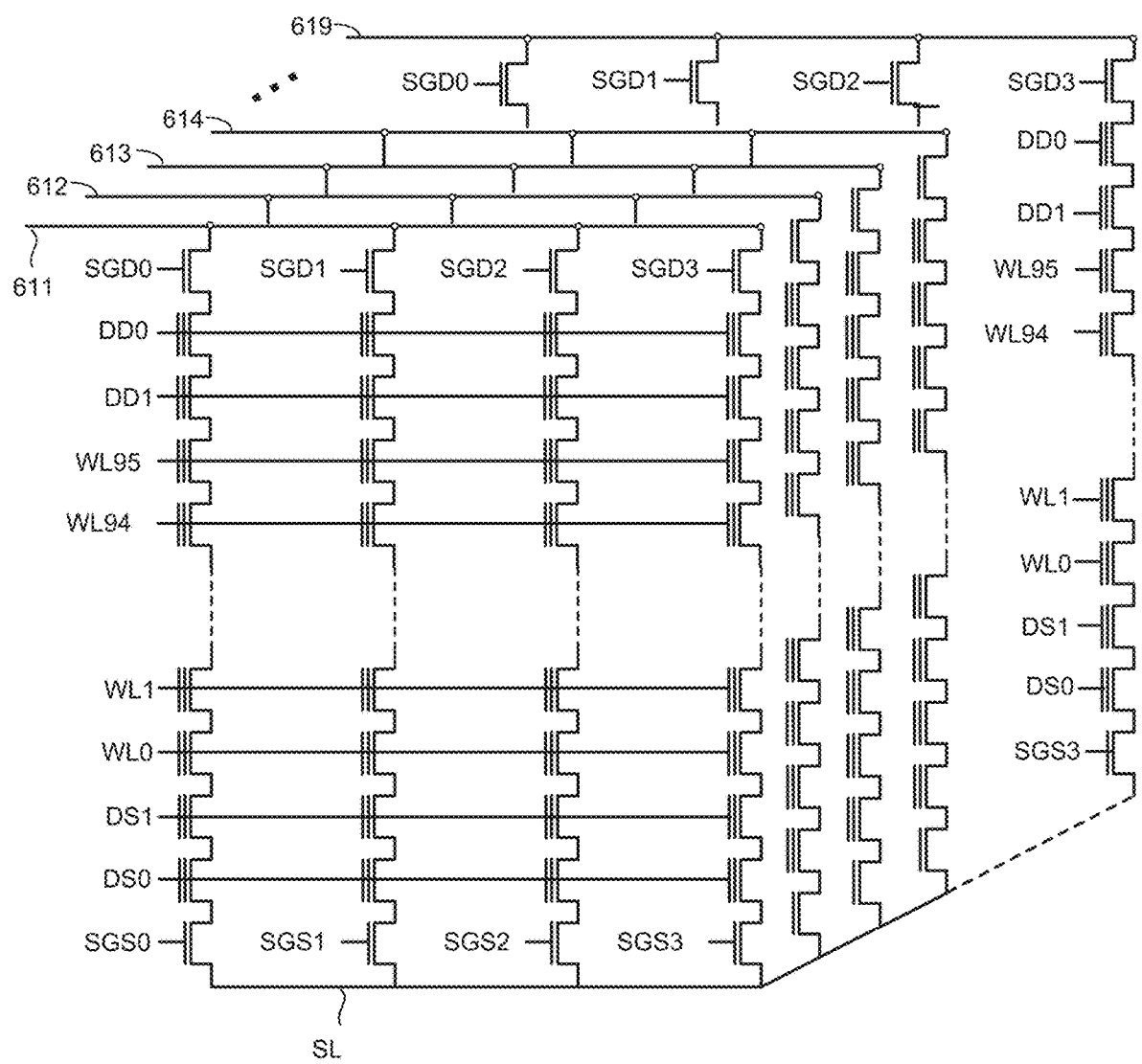
FIG. 6F is a schematic of a plurality of NAND strings showing their connections along their control lines.

FIG. 6F is a schematic diagram of a portion of the memory depicted in FIGS. 6A-6E to illustrate their connection along control lines. FIG. 6F shows physical word lines WLL0-WLL95 running across the entire block. The structure of FIG. 6F corresponds to portion 606 in Block 2 of FIGS. 6A-6E, including bit lines 611, 612, 613, 614, . . . , 619. Within the block, each bit line is connected to four NAND strings. Drain side selection lines SGD0, SGD1. SGD2 and SGD3 are used to determine which of the four NAND strings connect to the associated bit line(s). Source side selection lines SGS0, SGS1, SGS2 and SGS3 are used to determine which of the four NAND strings connect to the common source line.

Although the example memory system of FIGS. 6A-6F is a three dimensional memory structure that includes vertical NAND strings with charge-trapping material, other (2D and 3D) memory structures (e.g., MRAM, ReRAM, PCM) can also be used with the technology described herein.

The memory systems discussed above can be erased, programmed and read. At the end of a successful programming process (with verification), the threshold voltages of the memory cells should be within one or more distributions of threshold voltages for programmed memory cells or within a distribution of threshold voltages for erased memory cells, as appropriate.

FIG. 7A is a graph of threshold voltage versus number of memory cells, and illustrates example threshold voltage distributions for the memory array when each memory cell stores one bit of data. FIG. 7A shows two threshold voltage distributions: E and P. Threshold voltage distribution E corresponds to an erased data state. Threshold voltage distribution P corresponds to a programmed data state. Memory cells that have threshold voltages in threshold voltage distribution E are, therefore, in the erased data state (e.g., they are erased). Memory cells that have threshold voltages in threshold voltage distribution P are, therefore, in the programmed data state (e.g., they are programmed). In one embodiment, erased memory cells store data "1" and programmed memory cells store data "0." Memory cells that store one bit of data are referred to as single level cells ("SLC").

FIG. 7B is a graph of threshold voltage versus number of memory cells, and illustrates example threshold voltage distributions for the memory array when each memory cell stores three bits of data. Other embodiments, however, may use other data capacities per memory cell (e.g., such as one, two, four, or five bits of data per memory cell). Memory cells that store more than one bit of data are referred to as multi-level cells ("MLC"). FIG. 7B shows eight threshold voltage distributions, corresponding to eight data states. For a data state N, that data state N has higher threshold voltages than data state N−1 and lower threshold voltages than data state N+1. The first threshold voltage distribution (data state) S0 represents memory cells that are erased. The other seven threshold voltage distributions (data states) S1-S7 represent memory cells that are programmed and, therefore, are also called programmed data states. In some embodiments, data states S1-S7 can overlap, with memory controller 102 relying on error correction to identify the correct data being stored.

FIG. 7B shows seven read reference voltages, Vr1, Vr2, Vr3, Vr4, Vr5, Vr6, and Vr7 for reading data from memory cells. By testing (e.g., performing sense operations) whether the threshold voltage of a given memory cell is above or below the seven read reference voltages, the system can determine what data state (i.e., S0, S1, S2, S3, . . . ) a memory cell is in. In FIG. 7A, read reference voltage Vr is used to test whether memory cells are erased or programmed.

FIG. 7B also shows seven verify reference voltages, Vv1, Vv2, Vv3, Vv4, Vv5, Vv6, and Vv7 (also referred to as verify target voltages). When programming memory cells to data state S1, the system will test whether those memory cells have a threshold voltage greater than or equal to Vv1. When programming memory cells to data state S2, the system will test whether the memory cells have threshold voltages greater than or equal to Vv2. When programming memory cells to data state S3, the system will determine whether memory cells have their threshold voltage greater than or equal to Vv3. When programming memory cells to data state S4, the system will test whether those memory cells have a threshold voltage greater than or equal to Vv4. When programming memory cells to data state S5, the system will test whether those memory cells have a threshold voltage greater than or equal to Vv5. When programming memory cells to data state S6, the system will test whether those memory cells have a threshold voltage greater than or equal to Vv6. When programming memory cells to data state S7, the system will test whether those memory cells have a threshold voltage greater than or equal to Vv7.

In one embodiment, known as full sequence programming, memory cells can be programmed from the erased data state S0 directly to any of the programmed data states S1-S7. For example, a population of memory cells to be programmed may first be erased so that all memory cells in the population are in erased data state S0. Then, a programming process is used to program memory cells directly into data states S1, S2, S3, S4, S5, S6, and/or S7. For example, while some memory cells are being programmed from data state S0 to data state S1, other memory cells are being programmed from data state S0 to data state S2 and/or from data state S0 to data state S3, and so on. The arrows of FIG. 7B represent the full sequence programming. The technology described herein can also be used with other types of programming in addition to full sequence programming including (but not limited to) multiple stage/phase programming.

Each threshold voltage distribution (data state) of FIG. 7B corresponds to predetermined values for the set of data bits stored in the memory cells. The specific relationship between the data programmed into the memory cell and the threshold voltage levels of the memory cell depends upon the data encoding scheme adopted for the memory cells. In one embodiment, data values are assigned to the threshold voltage ranges using a Gray code assignment so that if the threshold voltage of a memory erroneously shifts to its neighboring physical state, only one bit will be affected.

FIG. 7C is a table describing one example of an assignment of data values to data states. In the table of FIG. 7B, S0=111 (erased state), S1=110, S2=100, S3=000, S4=010, S5=011, S6=001 and S7=101. Other encodings of data can also be used. No particular data encoding is required by the technology disclosed herein. In one embodiment, when a block is subjected to an erase operation, all memory cells are moved to data state S0, the erased state. Referring back to FIG. 4, in one embodiment the ADL, BDL, and CDL data latches can respectively be used for the lower, middle, and upper page data values of a memory cell during a program operation.

In general, during verify operations and read operations, the selected word line is connected to a voltage (one example of a reference signal), a level of which is specified for each read operation (e.g., see read reference voltages Vr1, Vr2, Vr3, Vr4, Vr5, Vr6, and Vr7, of FIG. 6) or verify operation (e.g. see verify reference voltages Vv1, Vv2, Vv3, Vv4, Vv5, Vv6, and Vv7 of FIG. 6) in order to determine whether a threshold voltage of the concerned memory cell has reached such level. After applying the word line voltage, the conduction current of the memory cell is measured to determine whether the memory cell turned on (conducted current) in response to the voltage applied to the word line. If the conduction current is measured to be greater than a certain value, then it is assumed that the memory cell turned on and the voltage applied to the word line is greater than the threshold voltage of the memory cell. If the conduction current is not measured to be greater than the certain value, then it is assumed that the memory cell did not turn on and the voltage applied to the word line is not greater than the threshold voltage of the memory cell. During a read or verify process, the unselected memory cells are provided with one or more read pass voltages (also referred to as bypass voltages) at their control gates so that these memory cells will operate as pass gates (e.g., conducting current regardless of whether they are programmed or erased).

There are many ways to measure the conduction current of a memory cell during a read or verify operation. In one example, the conduction current of a memory cell is measured by the rate it discharges or charges a dedicated capacitor in the sense amplifier. In another example, the conduction current of the selected memory cell allows (or fails to allow) the NAND string that includes the memory cell to discharge a corresponding bit line. The voltage on the bit line is measured after a period of time to see whether it has been discharged or not. Note that the technology described herein can be used with different methods known in the art for verifying/reading. Other read and verify techniques known in the art can also be used.

FIG. 8 is a flowchart describing one embodiment of a process for programming that is performed by memory die 300/307. In one example embodiment, the process of FIG. 8 is performed on memory die 300/307 using the control circuit discussed above, at the direction of state machine 362. The process of FIG. 8 is performed to implement the programming of FIG. 7A, the full sequence programming of FIG. 7B, or other programming schemes including multi-stage programming. When implementing multi-stage programming, the process of FIG. 8 is used to implement any/each stage of the multi-stage programming process.

Figure 9:
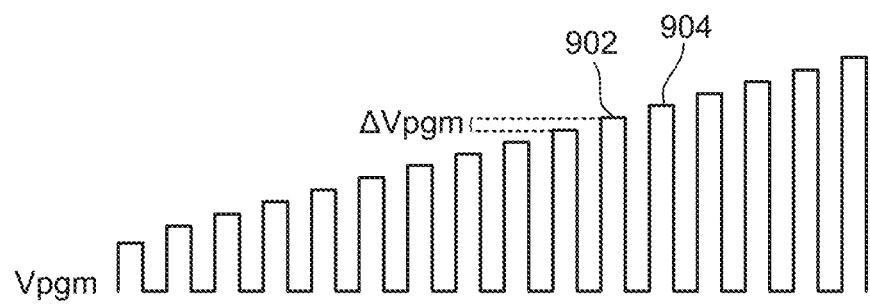
FIG. 9 depicts a series of programming voltage pulses.

Typically, a programming signal Vpgm is applied to the control gates (via a selected word line) during a program operation as a series of programming voltage pulses, as depicted in FIG. 9. Between programming pulses are a set of verify pulses to perform verification. In many implementations, the magnitude of the program pulses is increased with each successive pulse by a predetermined step size $\Delta$Vpgm (e.g., 0.2 v-0.5 v). In step 870 of FIG. 8, the programming voltage (Vpgm) is initialized to the starting magnitude (e.g., ~12-16V or another suitable level) and a program counter PC maintained by state machine 362 is initialized at 1. In step 872, a program pulse of the programming signal Vpgm is applied to the selected word line (the word line selected for programming). In one embodiment, the group of memory cells being programmed concurrently are all connected to the same word line (the selected word line). The unselected word lines receive one or more boosting voltages (e.g., ~7-11 volts) to perform boosting schemes known in the art. In one embodiment, if a memory cell should be programmed, then the corresponding bit line is grounded. On the other hand, if the memory cell should remain at its current threshold voltage, then the corresponding bit line is connected to Vdd (e.g., 1-3.5 volts) to inhibit programming. In step 872, the programming voltage pulse is concurrently applied to all memory cells connected to the selected word line so that all of the memory cells connected to the selected word line are programmed concurrently. That is, they are programmed at the same time or during overlapping times (both of which are considered concurrent). In this manner all of the memory cells connected to the selected word line will concurrently have their threshold voltage change, unless they have been locked out from programming.

In step 874, the appropriate memory cells are verified using the appropriate set of verify reference voltages to perform one or more verify operations. In one embodiment, the verification process is performed by testing whether the threshold voltages of the memory cells selected for programming have reached the appropriate verify reference voltage.

In step 876, it is determined whether all the memory cells have reached their target threshold voltages (pass). If so, the programming process is complete and successful because all selected memory cells were programmed and verified to their target states. A status of "PASS" (or success) is reported in step 878. If, in 876, it is determined that not all of the memory cells have reached their target threshold voltages (fail), then the programming process continues to step 880.

In step 880, the system counts the number of memory cells that have not yet reached their respective target threshold voltage distribution. That is, the system counts the number of memory cells that have, so far, failed the verify process. This counting can be done by the state machine 362, the controller 102, or other logic. In one implementation, each of the sense blocks will store the status (pass/fail) of their respective memory cells. In one embodiment, there is one total count, which reflects the total number of memory cells currently being programmed that have failed the last verify step. In another embodiment, separate counts are kept for each data state.

In step 882, it is determined whether the count from step 880 is less than or equal to a predetermined limit. In one embodiment, the predetermined limit is a number of bits that can be corrected by error correction codes (ECC) during a read process for the page of memory cells. If the number of failed cells is less than or equal to the predetermined limit, then the programming process can stop and a status of "PASS" is reported in step 878. In this situation, enough memory cells were programmed correctly such that the few remaining memory cells that have not been completely programmed can be corrected using ECC during the read process. In some embodiments, step 880 will count the number of failed cells for each sector, each target data state or other unit, and those counts will individually or collectively be compared to one or more thresholds in step 882.

In one embodiment, the predetermined limit can be less than the total number of bits that can be corrected by ECC during a read process to allow for future errors. When programming less than all of the memory cells for a page, or comparing a count for only one data state (or less than all states), then the predetermined limit can be a portion (pro-rata or not pro-rata) of the number of bits that can be corrected by ECC during a read process for the page of memory cells. In some embodiments, the limit is not pre-determined. Instead, it changes based on the number of errors already counted for the page, the number of program-erase cycles performed or other criteria.

If the number of failed memory cells is not less than the predetermined limit, then the programming process continues at step 884 and the program counter PC is checked against the program limit value (PL). Examples of program limit values include 6, 20 and 30; however, other values can be used. If the program counter PC is not less than the program limit value PL, then the program process is considered to have failed and a status of FAIL is reported in step 888. If the program counter PC is less than the program limit value PL, then the process continues at step 886 during which time the Program Counter PC is incremented by 1 and the program voltage Vpgm is stepped up to the next magnitude. For example, the next pulse will have a magnitude greater than the previous pulse by a step size (e.g., a step size of 0.1-0.4 volts). After step 886, the process loops back to step 872 and another program pulse is applied to the selected word line so that another iteration (steps 872-886) of the programming process of FIG. 8 is performed.

Because it is possible that errors can occur when programming or reading, and errors can occur while storing data (e.g., due to electrons drifting, data retention issues or other phenomenon), error correction is used with the programming of data. Memory systems often use Error Correction Codes (ECC) to protect data from corruption. Many ECC coding schemes are well known in the art. These conventional error correction codes are especially useful in large scale memories, including flash (and other non-volatile) memories, because of the substantial impact on manufacturing yield and device reliability that such coding schemes can provide, rendering devices that have a few non-programmable or defective cells as useable. Of course, a tradeoff exists between the yield savings and the cost of providing additional memory cells to store the code bits (i.e., the code "rate"). As such, some ECC codes are better suited for flash memory devices than others. Generally, ECC codes for flash memory devices tend to have higher code rates (i.e., a lower ratio of code bits to data bits) than the codes used in data communications applications (which may have code rates as low as 1/2). Examples of well-known ECC codes commonly used in connection with flash memory storage include Reed-Solomon codes, other BCH codes, Hamming codes, and the like. Sometimes, the error correction codes used in connection with flash memory storage are "systematic," in that the data portion of the eventual code word is unchanged from the actual data being encoded, with the code or parity bits appended to the data bits to form the complete code word.

The particular parameters for a given error correction code include the type of code, the size of the block of actual data from which the code word is derived, and the overall length of the code word after encoding. For example, a typical BCH code applied to a sector of 512 bytes (4096 bits) of data can correct up to four error bits, if at least 60 ECC or parity bits are used. Reed-Solomon codes are a subset of BCH codes, and are also commonly used for error correction. For example, a typical Reed-Solomon code can correct up to four errors in a 512 byte sector of data, using about 72 ECC bits. In the flash memory context, error correction coding provides substantial improvement in manufacturing yield, as well as in the reliability of the flash memory over time.

In some embodiments, controller 102 receives host data (also referred to as user data or data from an entity external to the memory system), also referred to as information bits, that is to be stored non-volatile memory structure 302. The informational bits are represented by the matrix i=[1 0] (note that two bits are used for example purposes only, and many embodiments have code words longer than two bits). An error correction coding process (such as any of the processes mentioned above or below) is implemented by ECC engine 226/256 of controller 102 in which parity bits are added to the informational bits to provide data represented by the matrix or code word v=[1 0 1 0], indicating that two parity bits have been appended to the data bits. Other techniques can be used that map input data to output data in more complex manners. For example, low density parity check (LDPC) codes, also referred to as Gallager codes, can be used. More details about LDPC codes can be found in R. G. Gallager, "Low-density parity-check codes," IRE Trans. Inform. Theory, vol. IT-8, pp. 21 28, January 1962; and D.

MacKay, Information Theory, Inference and Learning Algorithms, Cambridge University Press 2003, chapter 47. In practice, such LDPC codes are typically applied (e.g., by ECC engine 226/256) to multiple pages encoded across a number of storage elements, but they do not need to be applied across multiple pages. The data bits can be mapped to a logical page and stored in memory structure 302 by programming one or more memory cells to one or more programming states, which corresponds to v.

In one embodiment, programming serves to raise the threshold voltage of the memory cells to one of the programmed data states S1-S7. Erasing serves to lower the threshold voltage of the memory cells to the Erase data state S0.

One technique to erase memory cells in some memory devices is to bias a p-well (or other types of) substrate to a high voltage to charge up a NAND channel. An erase enable voltage is applied to control gates of memory cells while the NAND channel is at a high voltage to erase the non-volatile storage elements (memory cells). Another approach to erasing memory cells is to generate gate induced drain leakage (GIDL) current to charge up the NAND string channel. An erase enable voltage is applied to control gates of the memory cells, while maintaining the string channel potential to erase the memory cells.

In one embodiment, the GIDL current is generated by causing a drain-to-gate voltage at a select transistor. A transistor drain-to-gate voltage that generates a GIDL current is referred to herein as a GIDL voltage. The GIDL current may result when the select transistor drain voltage is significantly higher than the select transistor control gate voltage. GIDL current is a result of carrier generation, i.e., electron-hole pair generation due to band-to-band tunneling and/or trap-assisted generation. In one embodiment, GIDL current may result in one type of carriers, e.g., holes, predominantly moving into NAND channel, thereby raising potential of the channel. The other type of carriers, e.g., electrons, are extracted from the channel, in the direction of a bit line or in the direction of a source line, by an electric field. During erase, the holes may tunnel from the channel to a charge storage region of memory cells and recombine with electrons there, to lower the threshold voltage of the memory cells.

The GIDL current may be generated at either end of the NAND string. A first GIDL voltage may be created between two terminals of a select transistor (e.g., drain side select transistor) that is connected to a bit line to generate a first GIDL current. A second GIDL voltage may be created between two terminals of a select transistor (e.g., source side select transistor) that is connected to a source line to generate a second GIDL current. Erasing based on GIDL current at only one end of the NAND string is referred to as a one-sided GIDL erase. Erasing based on GIDL current at both ends of the NAND string is referred to as a two-sided GIDL erase.

Figure 10:
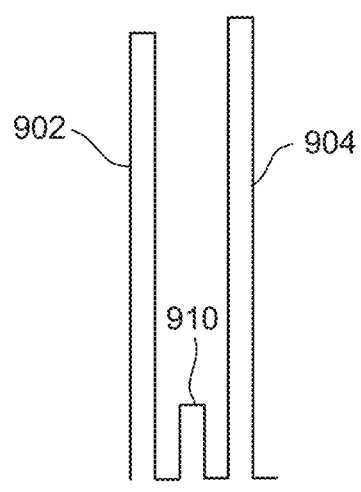
FIG. 10 depicts two programming voltage pulses and a verify voltage pulse.
Figure 11:
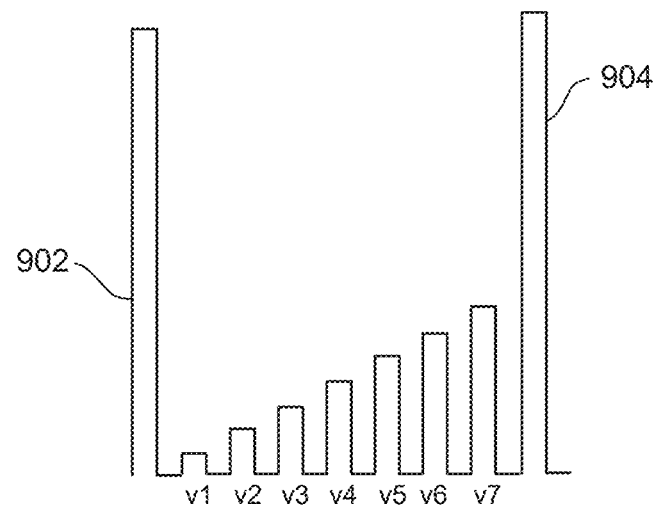
FIG. 11 depicts two programming voltage pulses and a set of verify voltage pulses.

As discussed above, FIG. 9 depicts the programming signal Vpgm as a series of programming voltage pulses. These programming voltage pulses are one example of doses of programming applied to a plurality of non-volatile memory cells being programmed to a data state. As described by FIG. 8, the system performs program verification between the doses of programming, as depicted in FIGS. 10 and 11. FIG. 10, which illustrates an embodiment in which memory cells store one bit of data per memory cell, depicts two of the programming voltage pulses 902 and 904 of FIG. 9. Between programming voltage pulses 902 and 904 is verify voltage pulse 910. In one embodiment, verify voltage pulse 910 has a magnitude of Vv (see FIG. 7A) and represents the system performing program verification (step 874) between the doses of programming (successive iterations of step 872).

FIG. 11, which illustrates an embodiment in which memory cells store three bits of data per memory cell, depicts two of the programming voltage pulses 902 and 904 of FIG. 9. Between programming voltage pulses 902 and 904 are verify voltage pulses v1, v2, v3, v4, v5, v6 and v7. In one embodiment, verify voltage pulse v1 has a magnitude of Vv1 (see FIG. 7B), verify voltage pulse v2 has a magnitude of Vv2, verify voltage pulse v3 has a magnitude of Vv3, verify voltage pulse v4 has a magnitude of Vv4, verify voltage pulse v5 has a magnitude of Vv5, verify voltage pulse v6 has a magnitude of Vv6, and verify voltage pulse v7 has a magnitude of Vv7. Verify voltage pulses v1, v2, v3, v4, v5, v6 and v7 represent the system performing program verification (step 874) between the doses of programming (successive iterations of step 872).

Figure 12:
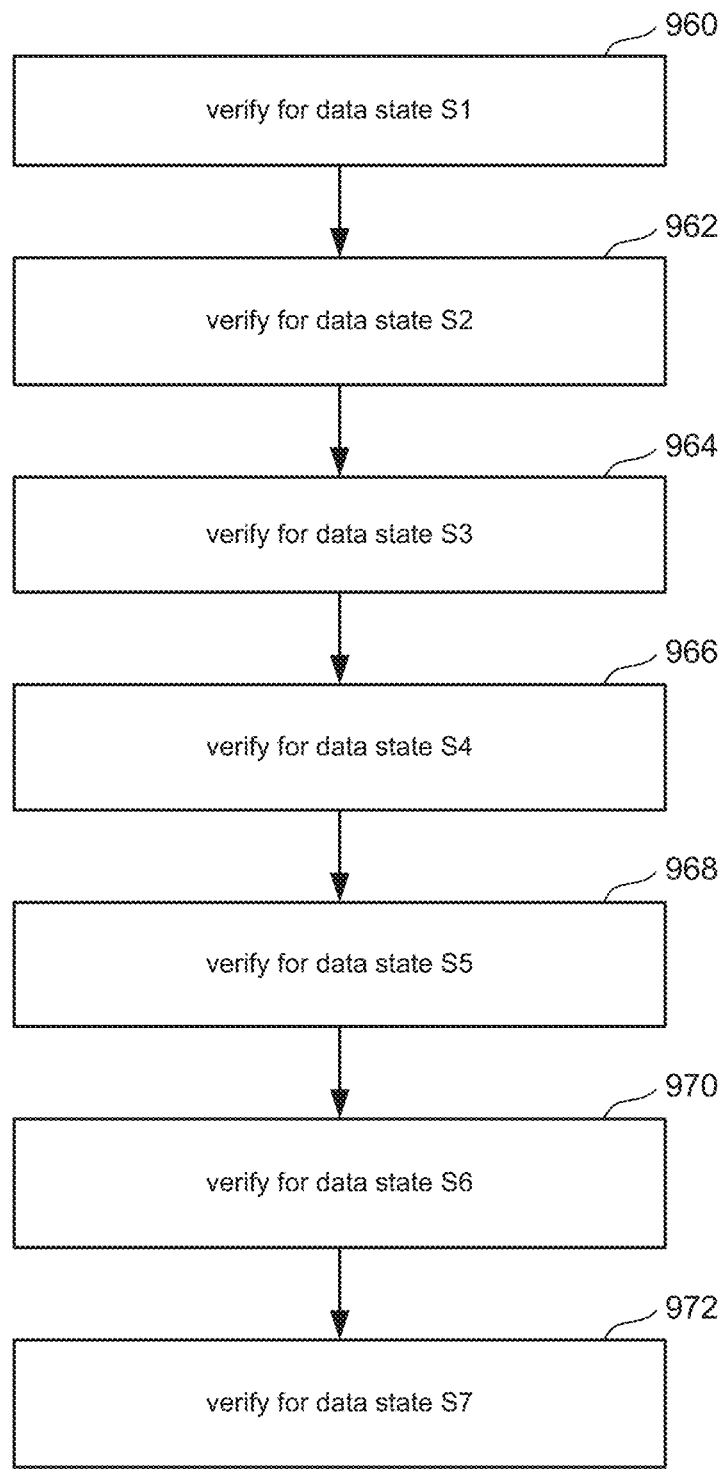
FIG. 12 is a flow chart describing one embodiment of a process for verifying programming of non-volatile memory.

FIG. 12 is a flow chart describing one embodiment of a process for verifying programming of non-volatile memory. That is, the process of FIG. 12 is a process performed during an example implementation of step 874 of FIG. 8 for an embodiment in which memory cells store three bits of data per memory cell. The process of FIG. 12 is performed using the waveforms of FIGS. 9 and 11. In step 960 of FIG. 12, the system performs verification for data state S1. For example, the system tests whether memory cells being programmed to data state S1 have threshold voltages greater than Vv1 (e.g., applying verify voltage pulse v1 of FIG. 11 to the control gates of memory cells being programmed to data state S1).

In step 962, the system performs verification for data state S2. For example, the system tests whether memory cells being programmed to data state S2 have threshold voltages greater than Vv2 (e.g., applying verify voltage pulse v2 of FIG. 11 to the control gates of memory cells being programmed to data state S2).

In step 964, the system performs verification for data state S3. For example, the system tests whether memory cells being programmed to data state S3 have threshold voltages greater than Vv3 (e.g., applying verify voltage pulse v3 of FIG. 11 to the control gates of memory cells being programmed to data state S3).

In step 966, the system performs verification for data state S4. For example, the system tests whether memory cells being programmed to data state S4 have threshold voltages greater than Vv4 (e.g., applying verify voltage pulses v4 of FIG. 11 to the control gates of memory cells being programmed to data state S4).

In step 968, the system performs verification for data state S5. For example, the system tests whether memory cells being programmed to data state S5 have threshold voltages greater than Vv5 (e.g., applying verify voltage pulses v5 of FIG. 11 to the control gates of memory cells being programmed to data state S5).

In step 970, the system performs verification for data state S6. For example, the system tests whether memory cells being programmed to data state S6 have threshold voltages greater than Vv6 (e.g., applying verify voltage pulse v6 of FIG. 11 to the control gates of memory cells being programmed to data state S6).

In step 972, the system performs verification for data state S7. For example, the system tests whether memory cells being programmed to data state S7 have threshold voltages greater than Vv7 (e.g., applying verify voltage pulse v7 of FIG. 11 to the control gates of memory cells being programmed to data state S7). Note that, in one embodiment, steps 960-972 are performed between doses of programming (e.g., between programming voltage pulses). In some embodiments, one or more of steps 960-972 can be skipped between certain programming voltage pulses. In one embodiment, steps 960-972 are performed sequentially (in any order or in the order depicted), while in other embodiments steps 960-972 are performed in parallel (e.g., concurrently).

The flow of FIG. 12 illustrates the verification of all of the target data states, but to speed up the verification phase of a programming operation a "smart verify" operation can be used. In a smart verify, not all of the target data state levels are checked. Initially, for the first few programming pulses, only the lower data states need to be checked. As the programming operation continues, and as the lower target data states begin to verify, additional higher data states are included; and, as the lower states finish, the lower target state verifies can be dropped out.

A program operation can include a single programming pass or multiple programming passes, where each pass uses incremental step pulse programming, for instance. The verify voltages in each program loop, including example verification signals v1-v7 in FIG. 11, can encompass lower assigned data states and then midrange assigned data states and then higher assigned data states as the program operations proceeds. FIG. 11 shows the use of all of v1-v7 between pulses 902 and 904, but in a smart verify operation usually only a subset is used. The verify voltages are part of a sensing operation. Memory cells are sensed during the application of the verification signal to judge their programming progress. A verify voltage is used to judge the programming progress of a memory cell.

Although 3D NAND is a cost driven storage technology, performance is also an important metric in many application scenarios. During the technology's development, there could be many cost or reliability concerns, such as due to program disturbs or read disturbs. Solutions to address these concerns can often compromise the memory device's performance, as these include things such as increasing word line/bit line capacitance/resistance or reducing programming waveform step size, for example. As the storage density of NAND memory increases, it is seeing great challenges in terms of both program and read performance. Therefore, it is very important to derive as much performance margin as possible starting from the fundamentals of device/array operation. In a programming loop, NAND memory will often use a channel pre-charge phase prior to applying a programming pulse, but this pre-charge consumes a relatively large proportion of the total programing time. Consequently, it would be desirable if the channel pre-charge time could be shortened or removed without introducing any adverse impact to the NAND programming. The following presents embodiments that use a negative word line based pre-boosting method to replace the conventional channel pre-charge. Compared to the standard channel pre-charge, this technique not only provides better boosting, but also greatly improves NAND programming times, particularly for multi-level cell (MLC) embodiments.

Figure 13:
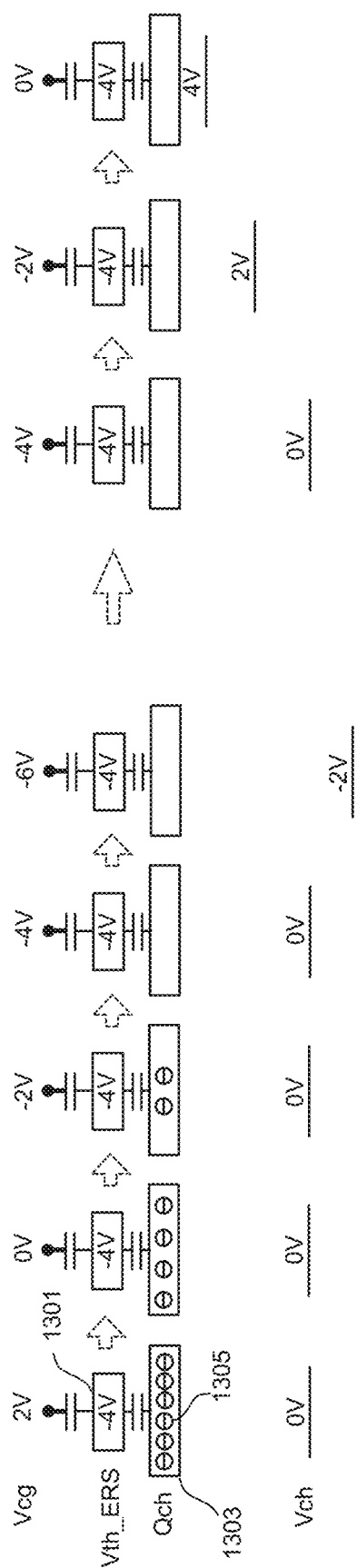
FIG. 13 illustrates the device and array physics of a negative word line pre-boosting strategy for programming NAND memory.

FIG. 13 illustrates the device and array physics of a negative word line pre-boosting strategy for programming NAND memory. In particular, it shows a memory cell in an erased state as a sequence of control gate voltages Veg are applied, along with the resultant channel voltage Vch. Looking at the memory cell at far left when Veg=2V, the control gate is capacitively coupled to the charge storing region 1301 in which is illustrated the threshold voltage of an erased memory cell Vth_ERS, as represented in the charge storing region 1301. In NAND memory as described above, an erased state will typically have a negative threshold voltage, where this example uses Vth_ERS=-4V. The charge storing region 1301 is capacitively coupled to the channel region 1303, where the number of electrons is schematically represented by 6 electrons, such as 1305, after the memory cells has been erased and has a Vcg=2V applied. Underneath shows the result channel voltage Vch, which at far left is Vch=0V. Moving to right, the Veg value is progressively decreased to 0V, -2V, -4V, and -6V. As Veg decreases, electrons are driven from the channel, so that at Vcg=Vth-ERS the electrons have largely been expelled. For a negative Vth memory cell in a NAND string that is turned on to electron reservoir, when its gate bias Veg goes from positive to negative, the channel potential Vch does not go negative until all electrons in the channel are squeezed away. At Vcg=-6V, Vch=Vcg-Vth_ERS=-2V.

After electrons under the low-Vth memory cell are squeezed away, the control circuitry can disconnect the NAND string from electron reservoir. Moving further right in FIG. 13, the control gate voltage Veg is raised back up to -4V, -2V, and then to 0V. In this condition, when Veg ramp back up to 0V, the channel potential will be coupled up to the absolute value of the negative Vth, i.e. |Vth_ERS|~3-4V, in ideal conditions. The embodiments below use this idea of borrowing the large negative Vth room of erased cells to create a pre-boosting condition for a subsequent program pulse.

Figure 14:
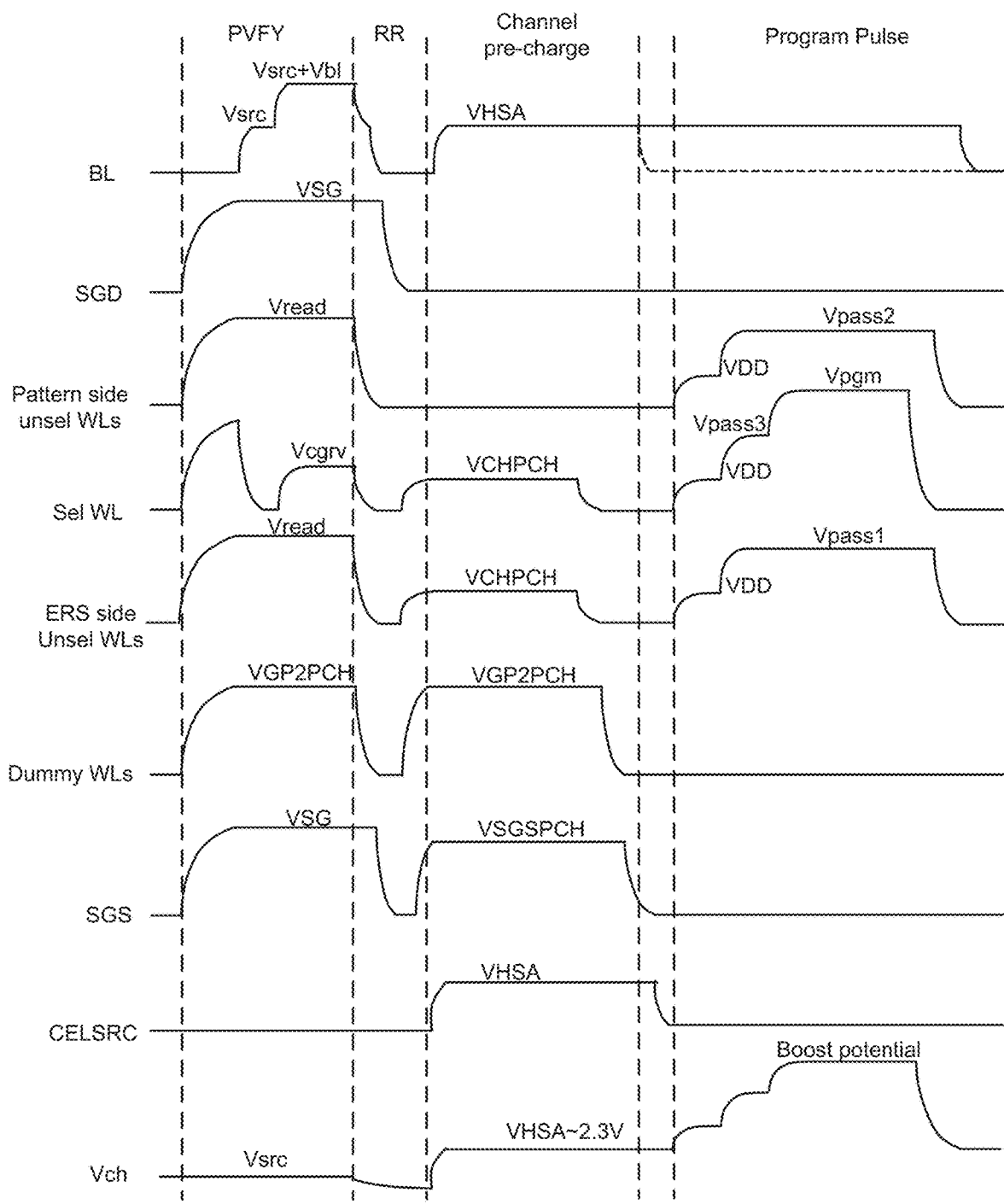
FIG. 14 is a set of waveforms for a programming loop using a typical channel pre-charge.

FIG. 14 is an embodiment for a set of waveforms for a programming loop using a typical channel pre-charge for comparison. The waveforms FIG. 14 include the sequence of a program verify (PVFY) phase, a read recover (RR) phase, channel pre-charge, and the program pulse phase. From top to bottom, the waveforms shown are: the NAND string's corresponding bit line (BL); the drain side select gate (SGD); the previously programmed ("pattern side") unselected word lines (Pattern side unsel WLs); the selected word line (sel WL); the yet to be programmed (erased side) word lines (ERS side unsel WLs); dummy word lines (Dummy WLs); source line (CELSRC); and channel voltage (Vch).

Staring from all bias levels at 0V and the channel at a level Vch=Vsrc, in the program verify phase all of the data word lines are initially raised to an overdrive voltage of the read bypass voltage Vread of a level sufficient to turn on the unselected memory cells, both select gates are biased to their on voltage VSG, and the dummy word lines set to their on voltage VGP2PCH, so that all transistors of the NAND string are on. The selected word line is then taken back to ground and the bit line charged up to Vsrc, and then on to Vsrc+Vbl while the selected word line is set to a read voltage Vegrv, corresponding to the state being verified. FIG. 14 and similar following figures only illustrate a single Vegrv level, but as discussed above in multiple state programming there may be several levels checked in a given loop. Once the sensing interval is complete, read recovery follows and all level are ramped back down to ground, with the word lines going first, along with the bit line, and then the select gates follow. This results in the channel voltage being pulled down somewhat.

Following read recovery, channel pre-charge follows. In this embodiment, the pattern side word lines are on the drain side of the selected word line. Both the drain side select gate and pattern side unselected word lines are kept at 0V. The selected word line and the erased side (here source side) word lines are ramped up to a channel pre-charge voltage, with the dummy word lines set to VGP2CH level, and the source side select gate set to its channel pre-charge level of VSGSPCH. The source and drain ends of the NAND string are then ramped up by setting the source line and bit line to a level VHSA, that can be a high voltage level used by the sense amplifier, such as boosting Vch to VHSA of ~2.3V, for example. The data storing word lines can then ramp down to ground, followed by the dummy word lines, and then followed by the source side select gate and source line. If the memory cell along the selected bit line is to be programmed, the bit line is taken to the program enable voltage of ground (dotted line); and if it is to be program inhibited, the bit line voltage stays at VHSA. Once these bias conditions are established, the programming pulse phase follows.

In the programming pulse phase of the embodiment of FIG. 14, all word lines are initially ramped up to the memory die's high supply level VDD, the up to a program bypass voltage Vpass. Here the erased side word lines use one value, Vpass1, and pattern side word lines use another value, Vpass2, as the memory cells on this side have been written. The selected word line in this example is ramped up from VDD to an intermediate value Vpass3 and then on the Vpgm voltage level of the current programming loop. Following the programming pulse phase, the programming loop returns to the subsequent verify operation.

Figure 15:
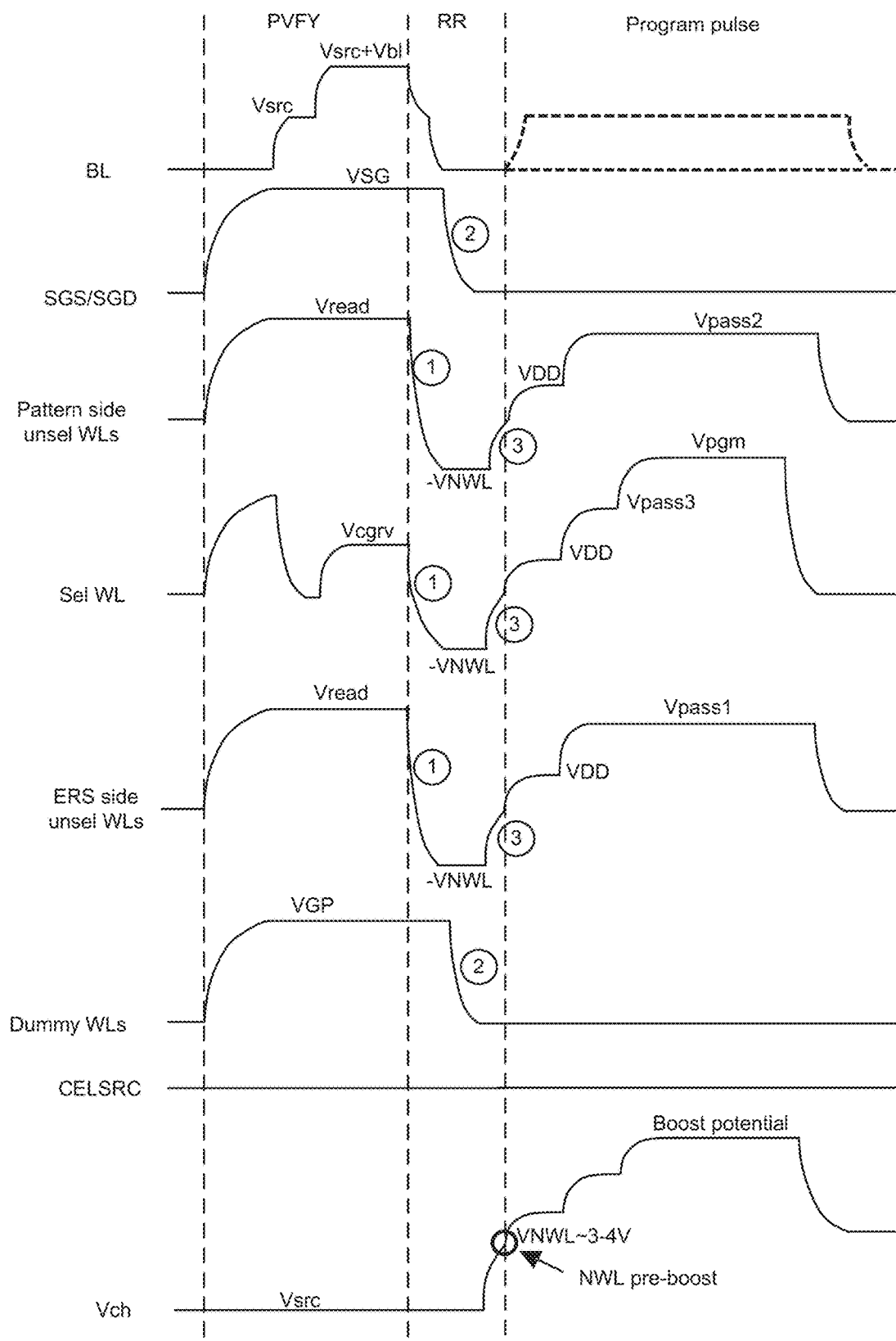
FIG. 15 is a set of waveforms for the bias voltages of a programming loop in an embodiment using negative word line voltage pre-boosting.

When using the conventional channel pre-charge illustrated in FIG. 14, a significant amount of the write time is consumed by the channel pre-charge phase. If it were possible to shorten or remove this phase, programming performance could be significantly improved. To this end, the following present embodiments that can incorporate negative word line pre-boosting into the read recovery phase. FIG. 15 illustrates a first embodiment.

FIG. 15 is a set of waveforms of an embodiment for the bias voltages of a programming loop in an embodiment using negative word line voltage pre-boosting. The program verify phase and program pulse phase bias levels are largely the same as in FIG. 14, but the read recovery phase is changed and the section of FIG. 14 between read recovery and program pulse, including channel pre-charge, is gone. Relative to FIG. 14, in the program verify phase the high dummy word line voltage is now labelled VGP, as it is not used in the (now absent) channel pre-charge phase.

Looking at the read recovery phase in the transition from verify phase to program pulse phase, as marked at (1) all of the word lines are ramped down directly to a negative word line voltage −VNWL, where this is about or somewhat lower than the threshold voltage of an erased memory cell, Vth_ERS. As described with respect to FIG. 13, this will drive the electrons from the channel region below the selected memory cell, taking the channel voltage Vch to ground or even a negative voltage level. The select gate and dummy word lines are then ramped down to ground to disconnect the NAND string at the source and drain ends, as marked at (2). As indicated at (3), the data word lines are then discharged from the negative voltage −VNWL back to ground. This pre-boosts the channel voltage Vch under the selected memory cell up to Vch=~3-4V, after which the program pulse phase follows in which the channel is further boosted to the boost potential as the selected word line voltage is increased (in this embodiment) through VDD to Vpass3 and on to Vpgm.

To improve data retention, the threshold voltage of the erased state Vth−ERS can be lowered, such as to −3V or lower, resulting in over 3V pre-boosting of the channel potential even before ramping up to Vpgm. As described with respect to FIG. 13, by taking −VNML to be below this value more electrons can be squeezed out the channel, which is beneficial for boosting. Compared to the more conventional program pre-charge described with respect to FIG. 14, the negative word line pre-boosting can not only provide better boosting, but also saves the pre-charge time and also last longer because residual electrons in the channel are fewer.

Figure 16:
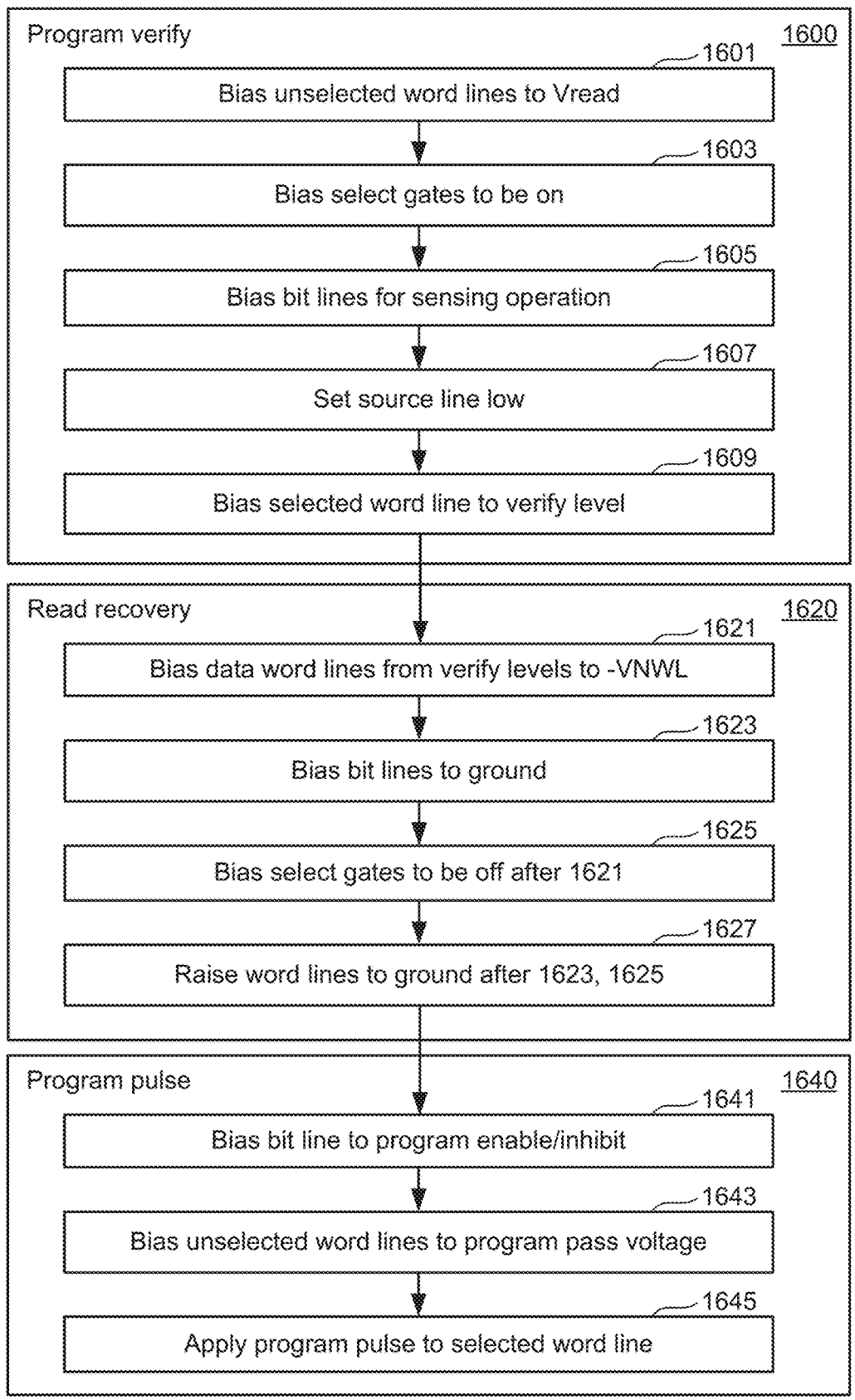
FIG. 16 is a flowchart for an embodiment of a programming loop using the negative word line pre-boost as illustrated by the waveforms of FIG. 15.

FIG. 16 is a flowchart for an embodiment of a programming loop using the negative word line pre-boost during read recovery as illustrated by the waveforms of FIG. 15. Relative to FIG. 8, the program verify phase 1600 can correspond to step 872 and the program pulse phase 1640 can correspond to step 872 of the subsequent loop.

Staring at step 1600, a program verify operation is performed. This can be a standard program verify as described above, with the system control logic 360 including state machine 362 performing the operation using the row control circuitry 320 for biasing the word lines (both data word lines and, if included, dummy word lines) and select gate control lines, and the column control circuitry 310 to bias the bit lines and perform sensing. More specifically, at step 1601 the unselected word lines are biased to the overdrive voltage level Vread. If there are dummy word lines, these can also be ramped up to their voltage (VGP) at the same time. The drain side and source side select gates are also turned on at step 1603 by biasing their control lines to VSG. At step 1605 the bit line is biased for a sensing operation, such as ramping up the bit lines and pre-charging the corresponding sense amplifiers. Also, during the sensing of the program verify phase (and, in this embodiment, the later phase) the source line voltage CELSRC is set to ground or other low voltage at step 1607. At step 1609, after an initial ramp up and back to ground, the selected word line is ramped up to the verify level (or levels) for the current loop. Once the sensing operation or operations of the verify complete, the read recovery phase 1620 follows.

In the read recovery phase 1620, the process can again be controller by the circuitry of the system control logic 360 including state machine 362 performing the operation using the row control circuitry 320 for biasing the word lines (both data word lines and, if included, dummy word lines) and the column control circuitry 310 to bias the bit lines and perform sensing. The negative voltage level can be generated by a negative voltage charge pump in the power control block 364, for example. At step 1621, the data word lines are taken from their verify voltage levels to the negative word line voltage −VNWL, where as discussed above this can be near or of a greater amplitude than the Vth of the erased state. Step 1621 corresponds to the ramp downs as marked (1) on FIG. 15. (In embodiments presented below, the unselected word lines are ramped down in a somewhat different manner.) The bit line is set to ground at step 1623. After step 1621, in step 1625 the select gates are taken to ground, as indicated at (2) of FIG. 15, where, in embodiments with dummy word lines, the dummy word lines can also be taken to ground. Following steps 1623 and 1625, at step 1627 the word lines previously biased to a negative voltage are ramped up to ground. The programming pulse phase can then follow at 1640.

The programing pulse phase 1640 can be as in the standard programming loop. More specifically, at step 1641 the bit line is biased to either the read enable voltage or read inhibit voltage depending on whether the selected memory cell has verified or not. At step 1643 the unselected word lines are biased to a program bypass voltage Vpass, where in the embodiment of FIG. 15 different overdrive voltages are used on the erased side (Vpass1) and the previously programmed side (Vpass 2). Once the NAND string is biased, at step 1645 the programming pulse Vpgm is applied to the selected word line.

As NAND memory continues to scale, in the form of increasing numbers of word line layers, number of fingers (see FIG. 6A), or both, the block size is rapidly increasing. With such a highly increasing rate for block sizes, the block size will become complicated to operate in terms of the extended block percentage, and hence cost increase. One approach to address this problem is to use a sub-block mode, where the sub-blocks can be individually selected for memory operations. However, the major challenge of sub-block mode is that the conventional channel pre-charge path may be blocked by data pattern from both source and drain sides, leading to bad boosting conditions and hence large program disturb. This can be illustrated with respect to FIG. 17.

Figure 17:
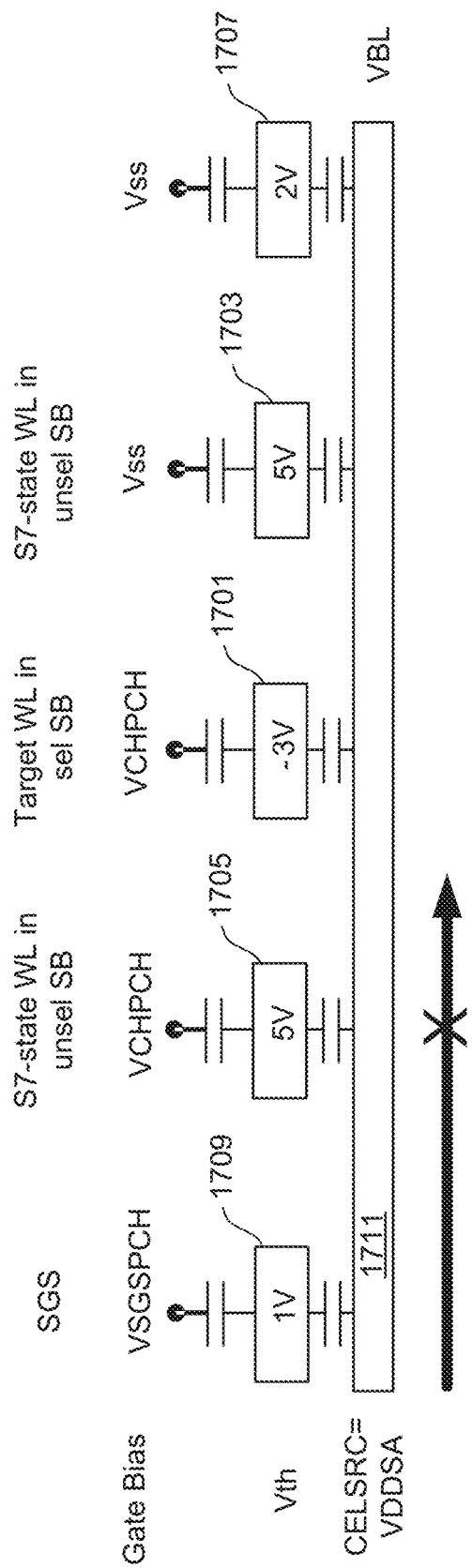
FIG. 17 illustrates the difficulties that can arise when using a conventional program pre-charge when there is data pattern at both the source and drain sides of the target word line.

FIG. 17 illustrates the difficulties that can arise when using a conventional program pre-charge when there is data pattern at both the source and drain sides of the target word line. FIG. 17 is a schematic representation of an abbreviated NAND string of the charge storage region of a memory cell 1701 in an erased state along a target word line, a memory cell 1703 and 1705 to either side, and then a drain side select gate 1707 and a source side select gate 1709. (Here the transistors are represented by their charge storage regions.) Each of these charge storage regions is capacitively coupled to the corresponding control voltage as shown above and capacitively coupled to the channel 1711. The threshold voltage Vth of each of the transistors is represented in the corresponding charge storage region. The source and drain side select gates in this example have respective Vth values of 1V and 2V, with the transistor to either side of the target memory cell shown programmed to the highest state S7 with a Vth=~5V. In an actual NAND string there can be a large number of memory cells to either side of the selected memory cells and these can be programmed to the different data states, but the discussion here can just look at a single memory cell programmed to the higher Vth level. The NAND string is biased for a source-side program pre-charge as in FIG. 14, with the source-side select gate 1709 biased to be on, the drain-side select gate 1707 and memory cell 1703 biased at Vss, and the source-side memory cell transistor 1705 and selected target memory cell 1701 biased at the channel pre-charge voltage level VCHPCH. In this example of a source-side program pre-charge, the source line voltage CELSRC is set at VDDSA and if the memory cell 1705 were in an erase state, the VDDSA voltage would pass and pre-charge the channel region under the target memory cell 1701; however, as the transistor 1705 has a Vth=~5V, the pre-charge level cannot pass and little or no pre-charge occurs. A similar set of considerations applies when pre-charging from the drain side.

The following looks at two different sub-block structures based on the 3D NAND described above with respect to FIGS. 6A-6F, where, although these will be presented separately, in some embodiments they can be combined. In a vertical sub-block embodiment, different layers of contiguous word lines can be operated as sub-blocks. For example, referring to FIG. 6D, the word lines above the joint region can form one sub-block and the word lines below the joint region can form another sub-block. Other embodiments can have a greater number of vertical sub-blocks made up of sets of contiguous word lines, but the two vertical sub-block arrangement will be used as an example embodiment. Referring now to FIG. 6A, another sub-block arrangement is based on lateral sub-blocks, where each of the fingers, such as the two shown in FIG. 6A, can be operated as sub-blocks. (These fingers are sometimes referred to as "strings", but the terminology fingers is used here to reduce confusion with NAND strings.) Embodiments related to vertical sub-blocks will be discussed first, followed by a discussion of embodiments related to lateral sub-blocks.

Referring back again to FIG. 6D, an example can consider its operation with the word lines above the joint as an upper sub-block and the word lines below the joint as a lower sub-block. Considering the case where the upper sub-block is unselected and previously programmed and the lower sub-block is programmed selected and using a program upper starting from the source and working toward the joint, this will lead to the situation where the upper sub-block and all of the word lines of the lower sub-block below the currently selected word line will have a programmed data pattern. Consequently, in the lower sub-block the word lines above the selected word lines will still be in an erased state, but, due to the upper sub-block being written, there will be programmed memory cells to the drain side. This is illustrated with respect to FIG. 18.

Figure 18:
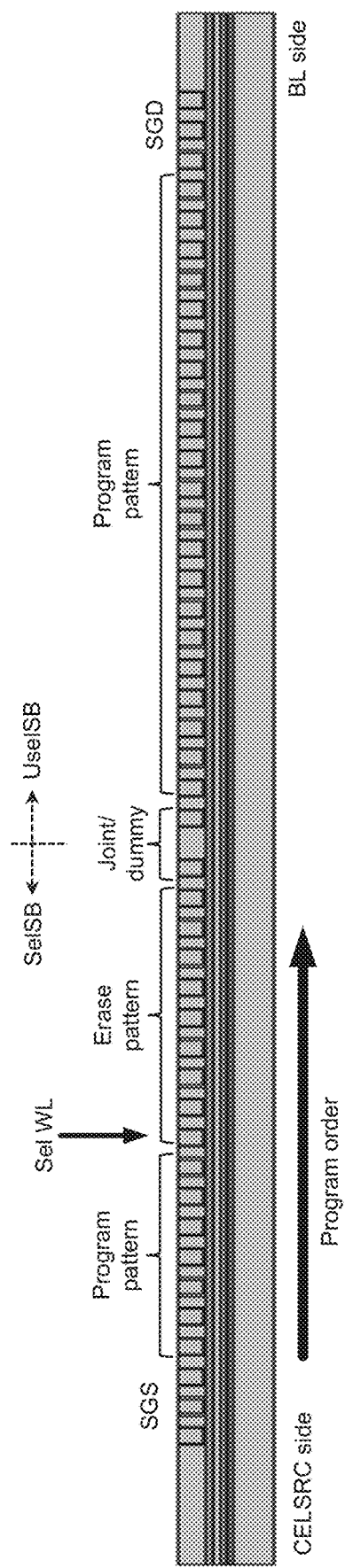
FIG. 18 illustrates an intermediate state in the programming of a lower sub-block when the upper sub-block is previously programmed.

FIG. 18 illustrates an intermediate state in the programming of a lower sub-block when the upper sub-block is previously programmed. Relative to FIGS. 6A-6F, the NAND string in FIG. 18 is laid out horizontally, with the source side at left and the bit line side at right. For example, a section of FIG. 18 would correspond to the right half of FIG. 6E cut vertically down the inner core 670 and rotated 90 degrees to the right. The select gates SGS and SGD are to either end and the joint and dummy word lines in the center. The upper sub-block (right of the joint) is unselected and programmed. The selected lower sub-block's program order is from the source toward the joint, so that the memory cells to the source side of the selected word line are programmed, while the selected word line and the word lines on its joint side are in an erased state. Consequently, the situation will be as in the simplified representation of FIG. 17, so that the use of a conventional program pre-charge will not be effective and can induce substantial program disturb. To address this, a negative word-line based program pre-boosting based waveform can be used, which can also improve program performance.

Figure 19:
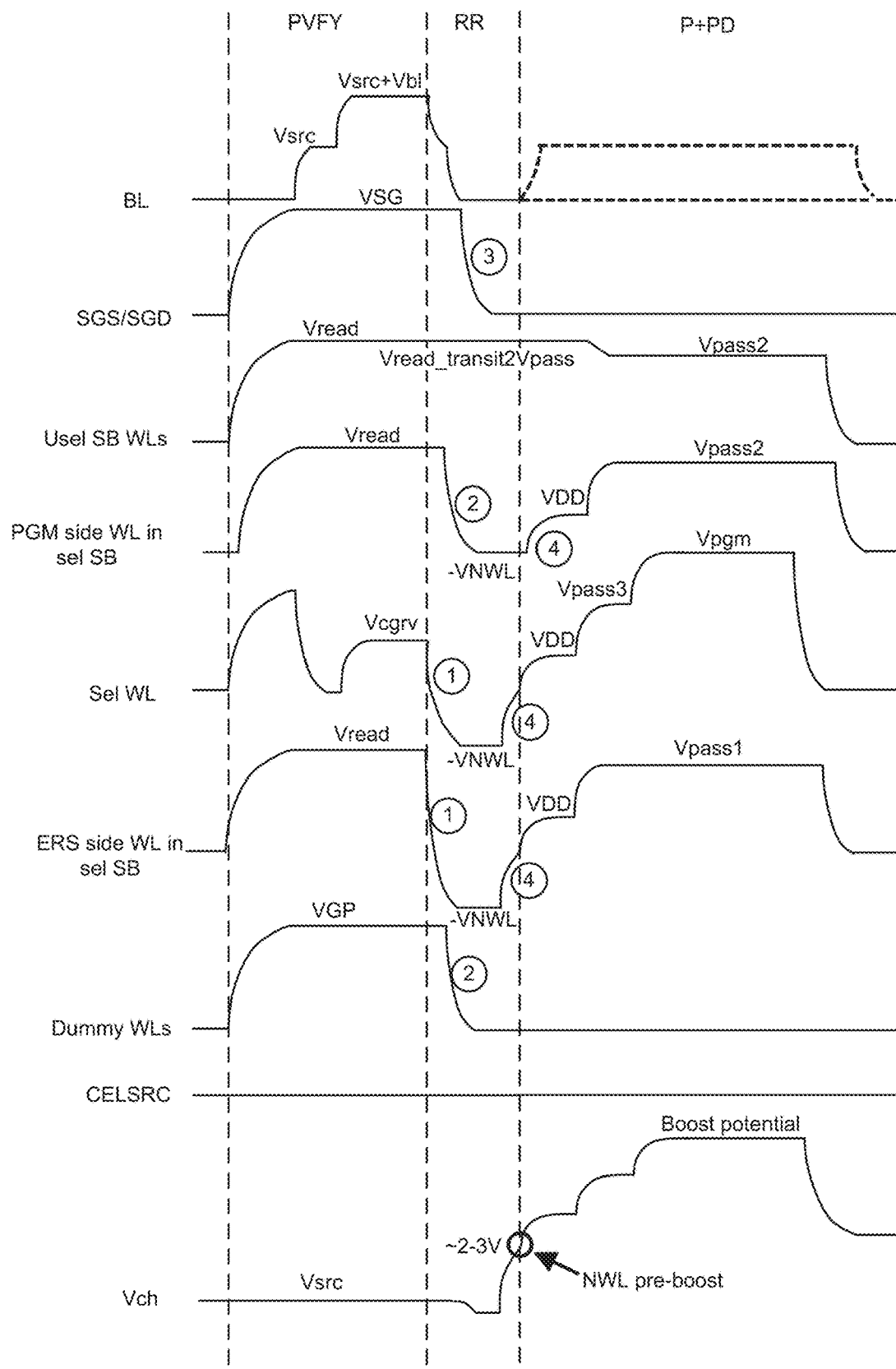
FIG. 19 is a set of waveforms for the bias voltages of a programming loop in an embodiment using negative word line voltage pre-boosting when used in NAND memory having vertical sub-block arrangement.

FIG. 19 is a set of waveforms for an embodiment of the bias voltages of a programming loop in an embodiment using negative word line voltage pre-boosting when used in NAND memory having a vertical sub-block arrangement. The program verify phase and program pulse phase bias levels are the same as in FIG. 15, but the read recovery phase is changed in some respects to account for vertical sub-block operation.

More specifically, the bit line waveform BL and the source line waveform CELSRC during read recovery are the same as in FIG. 15. A waveform Use1 SB WLs is added for the word lines of the unselected block or blocks, where now these word lines transition from Vread during verify to Vpass2 during the program phase without being discharged as are the word lines of the selected sub-block. This is illustrated by the transition Vread_transit2Vpass region, where this can be at the Vread level as shown here or at some other intermediate level as it transitions to Vpass2. Within the selected sub-block, on the erased side word lines and selected word line, these again discharged directly to the −VNWL bias level as indicated at (1), but the programmed pattern side word lines in the selected sub-block begin their discharge, at a somewhat later time as indicated at (2). (In embodiments with dummy word lines, these can also discharge at (2).) In step (2), some electrons may back flow to the target word line's channel and make the channel potential Vch shift toward a negative level, especially for edge word lines' programming. This negative coupling can be compensated for by the subsequent negative word line pre-boosting. Once the programmed side word lines in the selected sub-block are discharged to the −VNWL bias level (and any dummy word lines are taken to ground), the selected gates are taken to ground and turned off at (3). Alternately, the ramp down of dummy word lines can be done earlier to cut off electron back flow, as done in FIG. 15. At (4), the negatively biased word lines are then ramped up though ground to VDD and onto the program phase bias levels. This will again boost the channel for the selected word line as with the case of FIG. 15. In alternate embodiments, both for the sub-blocks cases and also for the embodiments described with respect to FIG. 15, a channel pre-charge such as in FIG. 14 can be combined with the negative word line pre-boosting for even better boost, although this would not provide the same improvements in programming times.

Figure 20:
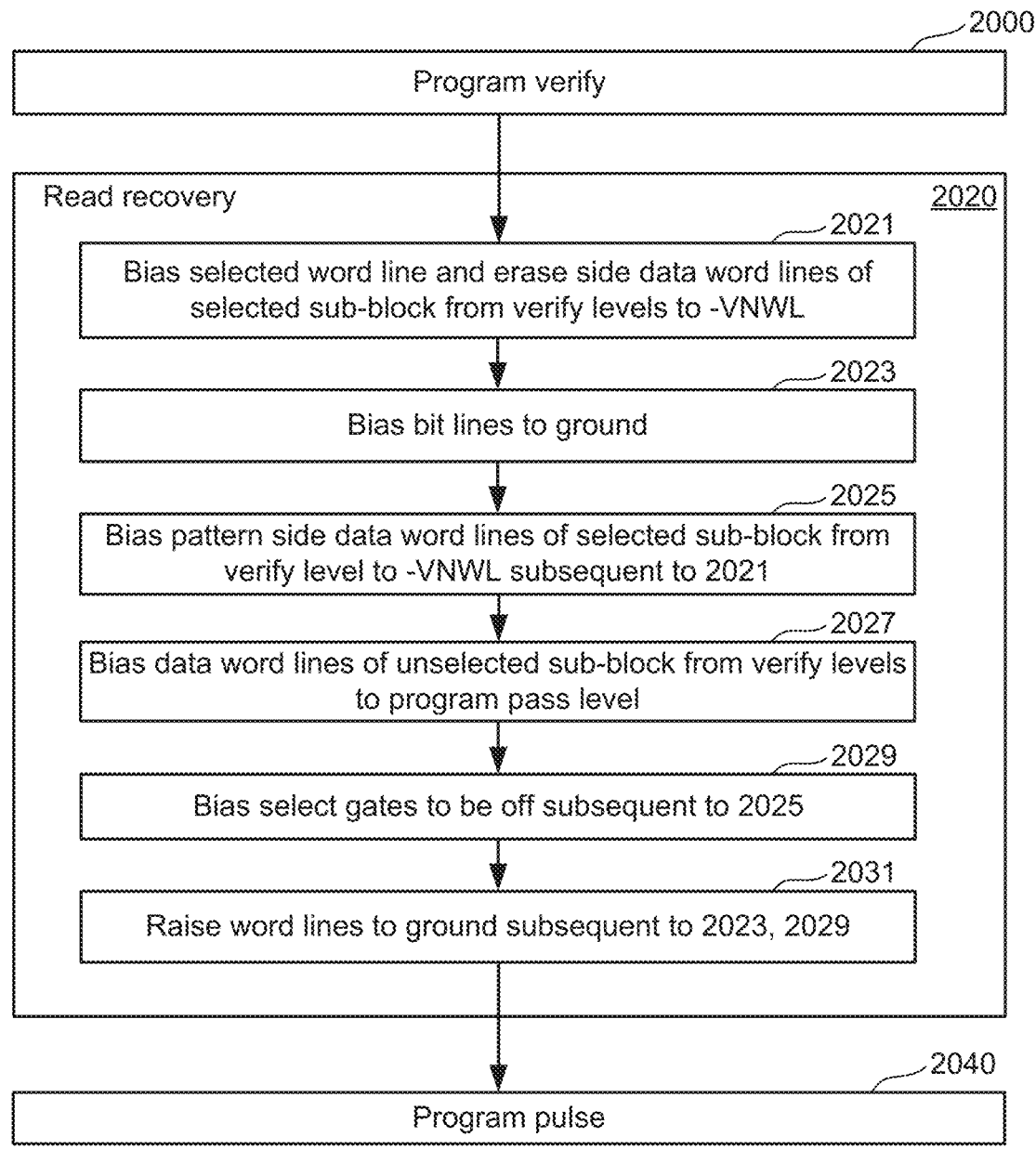

FIG. 20 is a flowchart for an embodiment of a programming loop using the negative word line pre-boost as illustrated by the waveforms of FIG. 19. Relative to FIG. 16, the program verify phase 2000 step and the program pulse 2040 step can respectively be as described with respect to corresponding steps 1600 and 1640. Relative to step 1620 of FIG. 16, the read recovery phase at step 2020 now accommodates horizontal sub-blocks.

In the read recovery phase 2020, the process can again be controller by the circuitry of the system control logic 360 including state machine 362 performing the operation using the row control circuitry 320 for biasing the word lines (both data word lines and, if included, dummy word lines) and the column control circuitry 310 to bias the bit lines and perform sensing. The negative voltage level can be generated by a negative voltage charge pump in the power control block 364, for example. At step 2021, the selected word line and the erased side word lines of the selected sub-block are taken from their verify voltage levels directly to the negative word line voltage −VNWL, where this can be around or more negative than the Vth of the erased state. Step 2021 corresponds to the ramp downs as marked (1) on FIG. 19 The bit line is set to ground at step 1623. After step 2021, in step 2025 the already programmed word lines of the selected sub-block are ramped down to −VNWL as indicated at (2) of FIG. 19, where, in embodiments with dummy word lines, the dummy word lines can also be taken to ground at this point. Step 2027 is for the word lines of the unselected sub-block that, over the course of the read recovery phase, change their voltage level from a read bypass voltage Vread to a program bypass voltage of Vpass2 used for programmed memory cells without going low in between. Following step 2025 as indicated at (2) in FIG. 19, the select gates are taken to ground at step 2029 as indicated at (3) of FIG. 19. Following steps 2023 and 2029, at step 2031 the word lines previously biased to a negative voltage are ramped up to ground. The programming pulse phase can then follow at 2040.

Considering now the case of lateral sub-blocks, referring back to FIG. 6A an example of this is when each of the shown fingers of NAND strings (one finger to the right of LI, one to the left) can be operated as sub-blocks. Although FIG. 6A shows two fingers, embodiments may have four, five, or other numbers of fingers. In other embodiments, lateral sub-block can be based on other types of bit line groups. In such an arrangement, the same word lines will run laterally through the NAND strings of both selected and unselected sub-blocks. If a conventional program pre-charge is used in lateral sub-block operation, this can result in significant amounts of program disturb in unselected, previously written sub-blocks. The next section looks at the use of a negative word-line based pre-boosting based program waveform to address the fundamental program disturb of lateral (by finger or bit line group) sub-block mode, with is expected to be more server than in the vertical sub-block arrangement.

Figure 21:
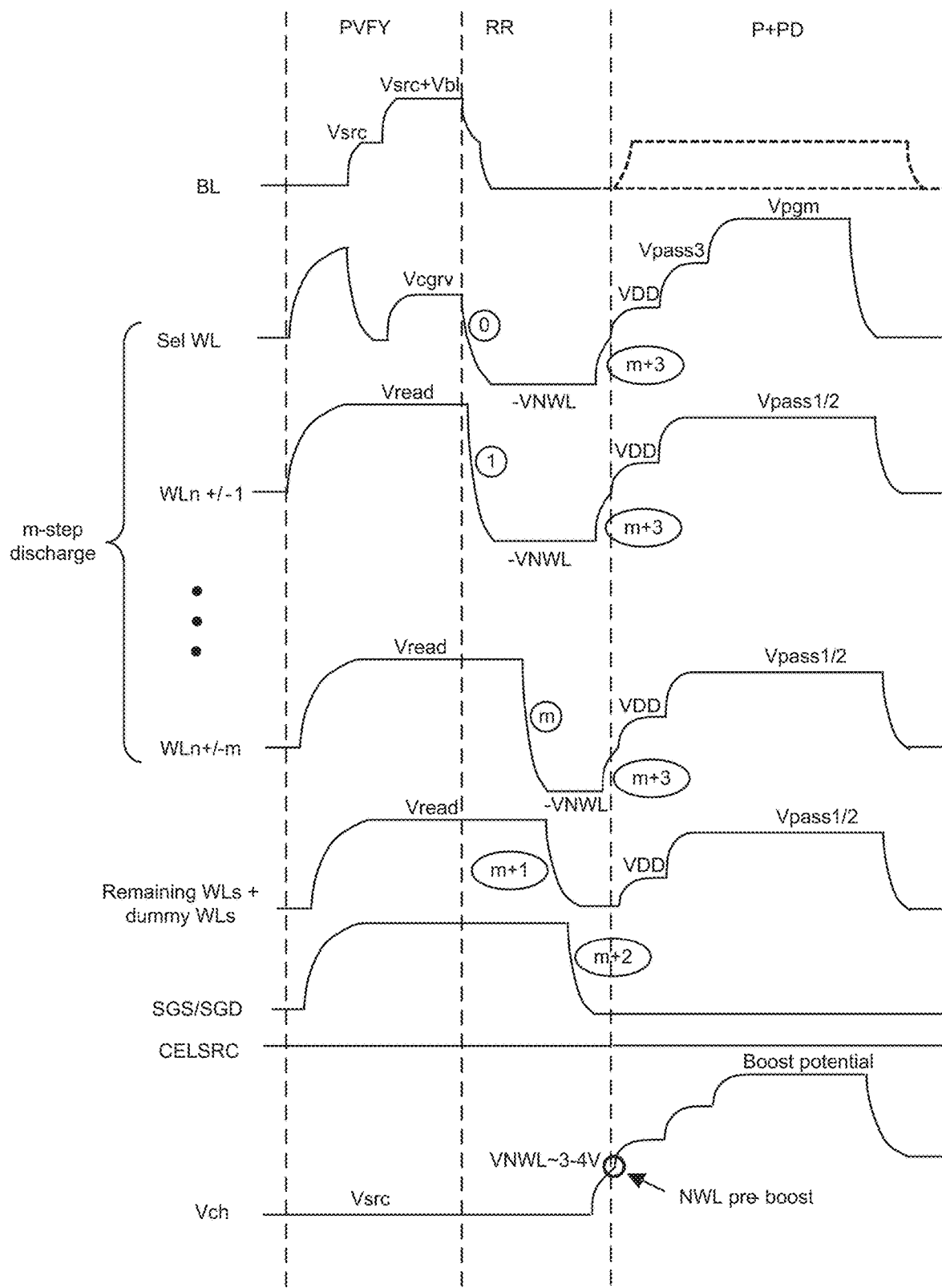
FIG. 21 is a flowchart for an embodiment of a programming loop using the negative word line pre-boost as illustrated by the waveforms of FIG. 20.

FIG. 21 is a set of waveforms for an embodiment of the bias voltages of a programming loop in an embodiment using negative word line voltage pre-boosting and by-word line discharge, such as can used in NAND memory having a lateral sub-block arrangement. The program verify phase and program pulse phase bias levels are the same as in FIG. 15 or 19, but the read recovery phase is changed in some respects to account for lateral sub-block operation.

More specifically, the bit line waveform BL and the source line waveform CELSRC during read recovery are the same as in FIG. 15. The selected word line and some number m of adjacent word lines to either side of the selected word line are sequentially ramped down from the verify voltage level to −VNWL. The value of m and timing details can be determined as part of device characterization. For example, m may be on the order of 5, 10, or 15, depending on the embodiment. Following the discharge of the selected word line at (0), there m-step discharge of the selected word line and word line by word line sequential discharge of m word lines to either side of the selected word line at (1) to (m). At step (m+1) the remaining word lines and dummy word lines, if any, are ramped down from their verify levels, but only to ground. The select gates are then taken to ground in step (m+2), after which all of the word lines discharged to −VNWL are ramped up to ground at (m+3). The bias conditions can then be set for the program pulse phase with the result channel boosting being similar to the that shown in FIGS. 15 and 19. In alternate embodiments, the channel pre-charge such as in FIG. 14 can be combined with the negative word line pre-boosted for even better boosting, although this would not provide the same improvements in programming times.

Figure 22:
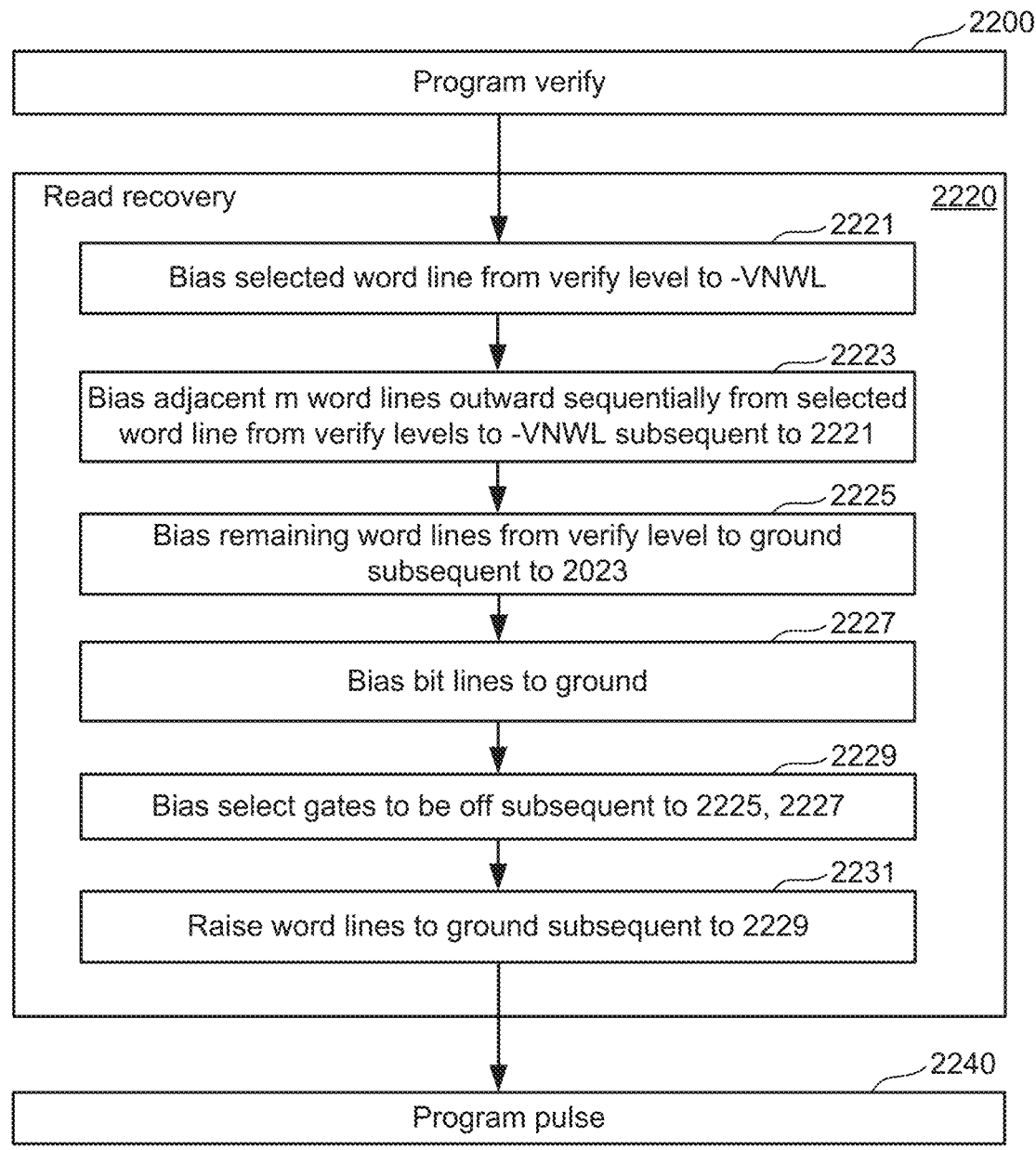
FIG. 22 is a flowchart for an embodiment of a programming loop using the negative word line pre-boost as illustrated by the waveforms of FIG. 21.

FIG. 22 is a flowchart for an embodiment of a programming loop using the negative word line pre-boost as illustrated by the waveforms of FIG. 21. Relative to FIG. 16, the program verify phase 2200 step and the program pulse 2240 step can respectively be as described with respect to corresponding steps 1600 and 1640. Relative to step 1620 of FIG. 16, the read recovery phase at step 2220 now accommodates lateral sub-blocks.

More specifically, the bit line waveform BL and the source line waveform CELSRC during read recovery are the same as in FIG. 15. For the selected word line and m word lines to either side, as marked at (0), (1), . . . , (m) FIG. 21, the selected word line (WLn) is first ramped down to −VNWL at step 2221, then its neighboring word lines to either side are ramped down to −VNWL one by one (from near to far) at step 2223. The range (m) of by-word line discharge can be determined by the minimum acceptable probability of finding a high-Vth cell. This can vary based on the embodiment. For example, in a binary, or SLC, embodiment, ~5 word lines may be sufficient for effective operation, while for MLC operations, such as for 3 or 4 bits per memory cell, this will typically be more. Considering that median Vth memory cells can also block a portion of back-flow electrons to the target word line, and the probability of finding median Vth cells is higher, the range for such MLC embodiment may be approximately ~10-15 word lines, where a precise number can be based on optimization for actual devices. Additionally, FIG. 21 and the flow of Figure consider a symmetric arrangement of m word lines to either side, but in other cases an asymmetric arrangement can be used. Also, if the selected word line is near enough to either the source or drain side, less than m word lines may be available on one side, so that the discharging to that side will stop at the last word line to that side will continuing on the other side.

The remaining data word lines and any dummy word lines are then ramped down to ground at (m+1) in step 2225. Along with taking the word lines to either −VNWL or ground, at step 2227 the bit lines also are set to ground. Once the bit lines and word lines are ramped down, they are followed by the select gates at (m+2) to disconnect the NAND string from its source and drain in step 2229. Once the waveforms are to −VNML or ground, at step 2231 ((m+3) in FIG. 21) the selected word line and its 2m neighbors are discharged from −VNWL up to ground. This will again boost the channel for the selected word line as with the case of FIG. 15. In alternate embodiments, both for the sub-blocks cases and also for the embodiments described with respect to FIG. 15, the channel pre-charge such as in FIG. 14 can be combined with the negative word line pre-boosted for even better boost, although this would not provide the same improvements in programming times.

One embodiment includes a non-volatile memory system, comprising a control circuit configured to connect to an array of non-volatile memory cells, the array including a first NAND string comprising a plurality of memory cells connected in series between a first bit line and a source line, connected to the first bit line through a drain side select gate and to the source line through a source side select gate, and each memory cell of the first NAND string connected to a corresponding word line, the control circuit configured to perform a program operation on a selected memory cell of the first NAND string. To perform the program operation, the control circuit is configured to: perform a program verify operation on the selected memory cell in which the word line corresponding to the selected memory cell is biased to a sensing voltage and the word lines connected to other memory cells of the first NAND string are biased to a read bypass voltage; perform a programming pulse operation on the selected memory cell in which the word line corresponding to the selected memory cell receives a programming voltage and the word lines corresponding to the other memory cells of the first NAND string are each biased to one of one or more program bypass voltages; and subsequent to the program verify operation and prior to the program pulse operation, perform a read recovery operation. In the read recovery operation the control circuit is configured to: discharge the word line corresponding to the selected memory cell from the sensing voltage to a negative word line voltage; discharge one or more of the word lines connected to the other memory cells of the first NAND string from the read bypass voltage to the negative word line voltage; and after discharging the word line corresponding to the selected memory cell and the one or more of the word lines connected to the other memory cells of the first NAND string to the negative word line voltage, raise a voltage level on the word line corresponding to the selected memory cell and the one or more of the word lines connected to the other memory cells of the first NAND string to ground.

One embodiment includes a method comprising applying an alternating sequence of programming pulses and one or more verify voltages to a selected word line of a block of a NAND memory array comprising a plurality of non-volatile memory cells; and transitioning between applying a first verify voltage to the selected word line and subsequently biasing the block of the NAND memory array for applying a following programming pulse to the selected word line by: ramping down the selected word line from the first verify voltage to a negative word line voltage; and ramping down one or more other word lines of the block of the NAND memory array from an overdrive voltage to the negative word line voltage.

One embodiment includes a non-volatile memory device, comprising: an array of non-volatile memory cells including a NAND string of a plurality of series connected memory cells each connected to a corresponding word line; and one or more control circuits connected to the word lines. The one or more control circuits are configured to: program a selected memory cell of the NAND string by applying an alternating sequence of programming pulses and a program verify voltages to a selected word line connected to the selected memory cell and, subsequent to applying a first verify voltage and prior to applying a following programming pulse, perform a read recovery operation in which the one or more control circuits are further configured to: discharge the selected word line from the first verify voltage to a negative word line voltage; discharge one or more of the word lines connected to other memory cells of the NAND string from an overdrive voltage to the negative word line voltage; and after discharging the selected word line and the word lines connected to the other memory cells of the NAND string to the negative word line voltage, raise a voltage level on the selected word line and the word lines connected to the other memory cells of the NAND string to ground.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A non-volatile memory device, comprising:
a control circuit configured to connect to a first NAND string that comprises a plurality of memory cells storing a plurality of data states including an erased state with a negative threshold voltage value and connected in series between a first bit line and a source line and each connected to a corresponding word line, where, to program a selected memory cell of the first NAND string, the control circuit is configured to:
program verify the selected memory cell by biasing the word line corresponding to the selected memory cell to a sensing voltage while biasing the word lines corresponding to other memory cells of the first NAND string to a read bypass voltage;
subsequently apply a pulse of a programming voltage to the word line corresponding to the selected memory cell while biasing the word lines corresponding to other memory cells of the first NAND string to a program bypass voltage; and
subsequent to program verifying and prior to applying the program pulse to the selected memory cell, perform a read recovery in which the control circuit is configured to:
discharge the word lines corresponding to the selected memory cell and one or more of the other memory cells of the first NAND string to a negative word line voltage, the negative word line voltage being more negative than the negative threshold voltage value of the erased state;
discharge the first bit line from a sensing level to ground; and
after discharging the word lines corresponding to the selected memory cell and the one or more of the other memory cells of the first NAND string to the negative word line voltage and discharging the first bit line to ground, raise a voltage level on the word lines corresponding to the selected memory cell and the one or more of the other memory cells of the first NAND string to ground.

2. The non-volatile memory device of claim 1, wherein the control circuit is on a control die, the non-volatile memory device further comprising:
a memory die including the array of non-volatile memory cells, the memory die separate from and bonded to the control die.

3. The non-volatile memory device of claim 1, wherein the plurality of memory cells of the first NAND string are connected to the first bit line through a drain side select gate and to the source line through a source side select gate, and wherein to perform the read recovery the control circuit is further configured to:
after discharging the word line corresponding to the selected memory cell and the one or more of the word lines connected to the other memory cells of the first NAND string to the negative word line voltage and prior to raising the voltage level on the word line corresponding to the selected memory cell and the one or more of the word lines connected to the other memory cells of the first NAND string to ground, discharge control gates of the drain side select gate and the source side select gate from an on voltage to an off voltage.

4. The non-volatile memory device of claim 1, wherein the control circuit is further configured to:
bias the source line to a low voltage level during the program verify, applying of the programming pulse, and the read recovery.

5. The non-volatile memory device of claim 1, wherein, to discharge the one or more of the word lines connected to the other memory cells of the first NAND string from the read bypass voltage to the negative word line voltage, the control circuit is further configured to:
discharge the word lines connected to the other memory cells of the first NAND string from the read bypass voltage to the negative word line voltage concurrently with discharging the word line corresponding to the selected memory cell from the sensing voltage to the negative word line voltage.

6. The non-volatile memory device of claim 1, wherein the memory cells of the first NAND string on a first of the source side or the drain side of the selected memory cell are in an erased state and the memory cells on a second of the source side or the drain side of the selected memory cell are in a programmed state, and wherein to discharge the one or more of the word lines connected to the other memory cells of the first NAND string from the read bypass voltage to the negative word line voltage, the control circuit is further configured to:
discharge the word lines connected to the memory cells on the first of the source side or the drain side of the selected memory cell from the read bypass voltage to the negative word line voltage concurrently with discharging the word line corresponding to the selected memory cell from the sensing voltage to the negative word line voltage; and
discharge the word lines connected to the memory cells on the second of the source side or the drain side of the selected memory cell from the read bypass voltage to the negative word line voltage after discharging the word line corresponding to the selected memory cell from the sensing voltage to the negative word line voltage.

7. The non-volatile memory device of claim 1, wherein the memory cells of the first NAND string comprises a first set of contiguous memory cells belonging to a first sub-block and a second set of contiguous memory cells belonging to a second sub-block, wherein the selected memory cell and the other memory cells of the first NAND string connected to the one or more word lines discharged from the read bypass voltage to the negative word line voltage belong to the first sub-block, and wherein to perform the read recovery the control circuit is further configured to:
change a bias level on word lines connected to memory cells of the second sub-block from the read bypass voltage to one of the one or more program bypass voltages without discharging the bias level on the word lines connected to memory cells of the second sub-block to a voltage level lower than the read bypass voltage.

8. The non-volatile memory device of claim 1, wherein to discharge the one or more of the word lines connected to the other memory cells of the first NAND string from the read bypass voltage to the negative word line voltage, the control circuit is further configured to:
subsequent to discharging the word line corresponding to the selected memory cell from the sensing voltage to the negative word line voltage, discharge a plurality of word lines connected to a plurality of the other memory cells of the first NAND string adjacent to and on either side of the selected memory cell from the read bypass voltage to the negative word line voltage sequentially outward from the adjacent memory cells nearest the selected memory cell.

9. The non-volatile memory device of claim 8, wherein the plurality of the other memory cells of the first NAND string adjacent to and on either side of the selected memory cell are less than all of the memory cells of the first NAND string, and wherein to perform the read recovery the control circuit is further configured to:
  subsequent to discharging the word lines connected to the plurality of the other memory cells of the first NAND string adjacent to and on either side of the selected memory cell and prior to raising a voltage level on the word line corresponding to the selected memory cell and the one or more of the word lines connected to the other memory cells of the first NAND string to ground, discharge the word lines connected to the other memory cells of the first NAND string that are not the other memory cells of the first NAND string adjacent to and on either side of the selected memory cell from the read bypass voltage to ground.

10. The non-volatile memory device of claim 1, further comprising:
  an array of non-volatile memory cells comprising a plurality of NAND strings, including the first NAND string, the array having a three dimensional structure in which the NAND strings run vertically relative to a substrate.

11. A method, comprising:
  applying an alternating sequence of programming pulses and one or more verify voltages to a selected word line of a block of a NAND memory array comprising a plurality of non-volatile memory cells configured to store a plurality of data states including an erased state with a negative threshold voltage value; and
  transitioning between applying a first verify voltage to the selected word line and subsequently biasing the block of the NAND memory array for applying a following programming pulse to the selected word line by:
    ramping down the selected word line from the first verify voltage to a negative word line voltage, the negative word line voltage being more negative than the negative threshold voltage value of the erased state; and
    ramping down one or more other word lines of the block of the NAND memory array from an overdrive voltage to the negative word line voltage.

12. The method of claim 11, wherein ramping down the one or more other word lines of the block of the NAND memory array from the overdrive voltage to the negative word line voltage comprises:
  wherein ramping down the one or more other word lines of the block of the NAND memory array from an overdrive voltage to the negative word line voltage concurrently with ramping down the selected word line from the first verify voltage to the negative word line voltage.

13. The method of claim 11, wherein memory cells connected along word lines of the block of NAND memory array on a first of a source side or a drain side of the selected word line are in an erased state and memory cells connected along word lines of the block of NAND memory array on a second of the source side or the drain side of the selected word line are in a programmed state, and wherein ramping down the one or more other word lines of the block of the NAND memory array from the overdrive voltage to the negative word line voltage comprises:
  ramping down the one or more other word lines of the block of the NAND memory array on the first of the source side or the drain side of the selected word line from the overdrive voltage to the negative word line voltage concurrently with ramping down the selected word line from the first verify voltage to the negative word line voltage; and
  ramping down the one or more other word lines of the block of the NAND memory array on the second of the source side or the drain side of the selected word line from the overdrive voltage to the negative word line voltage after ramping down the selected word line from the first verify voltage to the negative word line voltage.

14. The method of claim 11, wherein ramping down the one or more other word lines of the block of the NAND memory array from the overdrive voltage to the negative word line voltage comprises:
  after ramping down the selected word line from the first verify voltage to the negative word line voltage, ramping down a plurality of the one or more other word lines of the block of the NAND memory array adjacent to and on either side of the selected word line from the overdrive voltage to the negative word line voltage sequentially outward from adjacent word lines nearest the selected word line.

15. A non-volatile memory device, comprising:
  an array of non-volatile memory cells including a NAND string of a plurality of series connected memory cells each connected to a corresponding word line, the memory cells configured to store a plurality of data states including an erased state with a negative threshold voltage value; and
  one or more control circuits connected to the word lines and configured to:
    program a selected memory cell of the NAND string by applying an alternating sequence of programming pulses and one or more program verify voltages to a selected word line connected to the selected memory cell and, subsequent to applying a first verify voltage and prior to applying a following programming pulse, perform a read recovery operation in which the one or more control circuits are further configured to:
      discharge the selected word line from the first verify voltage to a negative word line voltage, the negative word line voltage being more negative than the negative threshold voltage value of the erased state;
      discharge one or more of the word lines connected to other memory cells of the NAND string from an overdrive voltage to the negative word line voltage; and
      after discharging the selected word line and the word lines connected to the other memory cells of the NAND string to the negative word line voltage, raise a voltage level on the selected word line and the word lines connected to the other memory cells of the NAND string to ground.

16. The non-volatile memory device of claim 15, wherein to discharge the one or more of the word lines connected to the other memory cells of the NAND string from the overdrive voltage to the negative word line voltage, the one or more control circuits are further configured to:

discharge the one or more of the word lines connected to the other memory cells of the NAND string from the overdrive voltage to the negative word line voltage concurrently with discharging the selected word line from the verify voltage to the negative word line voltage.

17. The non-volatile memory device of claim 15, wherein memory cells of the NAND string on a first of a source side or a drain side of the selected memory cell are in an erased state and the memory cells on a second of the source side or the drain side of the selected memory cell are in a programmed state, and wherein to discharge the one or more of the word lines connected to the other memory cells of the NAND string from the overdrive voltage to the negative word line voltage, the one or more control circuits are further configured to:

discharge the one or more of the word lines connected to the other memory cells of the NAND string on the first of the source side or the drain side of the selected memory cell from the overdrive voltage to the negative word line voltage concurrently with discharging the selected word line from the verify voltage to the negative word line voltage; and discharge the one or more of the word lines connected to the other memory cells of the NAND string on the second of the source side or the drain side of the selected memory cell from the overdrive voltage to the negative word line voltage after discharging the selected word line from the first verify voltage to the negative word line voltage.

18. The non-volatile memory device of claim 15, wherein to discharge the one or more of the word lines connected to the other memory cells of the NAND string from the overdrive voltage to the negative word line voltage, the one or more control circuits are further configured to:

after discharging the selected word line from the verify voltage to the negative word line voltage, discharge a plurality of word lines connected to a plurality of the other memory cells of the NAND string adjacent to and on either side of the selected memory cell from the overdrive voltage to the negative word line voltage sequentially outward from adjacent memory cells nearest the selected memory cell.

* * * * *